United States Patent [19]
Johnson

[11] Patent Number: 5,253,308
[45] Date of Patent: Oct. 12, 1993

[54] MASSIVELY PARALLEL DIGITAL IMAGE DATA PROCESSOR USING PIXEL-MAPPED INPUT/OUTPUT AND RELATIVE INDEXED ADDRESSING

[75] Inventor: William K. Johnson, Goleta, Calif.

[73] Assignee: Amber Engineering, Inc., Goleta, Calif.

[21] Appl. No.: 369,257

[22] Filed: Jun. 21, 1989

[51] Int. Cl.⁵ .............................................. G06K 9/00
[52] U.S. Cl. ........................................ 382/49; 382/41
[58] Field of Search ................ 382/41, 49, 27; 364/200, 716, 518

[56] References Cited

U.S. PATENT DOCUMENTS

| | | | |
|---|---|---|---|
| 3,106,698 | 10/1963 | Unger | 340/172.5 |
| 3,287,702 | 11/1966 | Borck, Jr. et al. | 340/172.5 |
| 3,287,703 | 11/1966 | Slotnick | 340/172.5 |
| 3,296,426 | 1/1967 | Ball | 235/175 |
| 3,308,436 | 3/1967 | Borck, Jr. et al. | 340/172.5 |
| 3,312,943 | 4/1967 | McKindles et al. | 340/172.5 |
| 3,364,472 | 1/1968 | Sloper | 340/172.5 |
| 3,815,095 | 6/1974 | Wester | 340/172.5 |
| 3,979,728 | 9/1976 | Reddaway | 340/172.5 |
| 4,101,960 | 7/1978 | Stokes et al. | 364/200 |
| 4,144,566 | 3/1979 | Timsit | 364/200 |
| 4,192,004 | 3/1980 | Buerger | 364/518 |
| 4,215,401 | 7/1980 | Holsztynski et al. | 364/200 |
| 4,270,169 | 5/1981 | Hunt et al. | 364/200 |
| 4,314,349 | 2/1982 | Batcher | 364/716 |
| 4,380,046 | 4/1983 | Fung | 364/200 |
| 4,467,422 | 8/1984 | Hunt | 364/200 |
| 4,468,727 | 8/1984 | Carrison et al. | 364/200 |
| 4,498,134 | 2/1985 | Hansen et al. | 364/200 |
| 4,507,726 | 3/1985 | Grinberg et al. | 364/200 |
| 4,550,437 | 10/1985 | Kobayashi et al. | 382/41 |
| 4,580,215 | 4/1986 | Morton | 364/200 |
| 4,593,351 | 6/1986 | Hong et al. | 364/200 |
| 4,739,474 | 4/1988 | Holsztynski | 364/200 |
| 4,908,751 | 3/1990 | Smith | 382/41 |

FOREIGN PATENT DOCUMENTS

| 8806322 | 8/1988 | PCT Int'l Appl. |
| 8902130 | 3/1989 | PCT Int'l Appl. |

OTHER PUBLICATIONS

L. de Sa, et al., "Image Processing System with Multiple DSPs" Microprocessing and Microprogramming, 25 (1989) Jan., Nos. 1-5, Amsterdam, NL, pp. 41-46.

E. B. Wagstaff, et al., "Integrated High Speed Parallel-Sequential Computer", Parallel Computers-Parallel Mathematics, International Association for Mathematics and Computers in Simulation, 1977, pp. 343-346.

Primary Examiner—Michael T. Razavi
Assistant Examiner—Yon Jung
Attorney, Agent, or Firm—Graham & James

[57] ABSTRACT

A massively parallel digital image data processor provides a large number of processing elements arranged in a two-dimensional matrix form. Relative indexed addressing among the processing elements is provided, whereby image data may be easily accessed by and shared among all processing elements. A single-instruction/multiple-data (SIMD) architecture provides instructions to the processing elements in parallel in accordance with specific application programs therefor. The processing elements use triple-ported register files for their internal memory which may input and output data independently and simultaneously. The processing elements are memory-mapped into the address space of the processor's embedded computer to simplify addressing thereof. All image data is inputted and outputted in pixel format. All image data is transferred, stored and processed in bit-serial format.

45 Claims, 13 Drawing Sheets

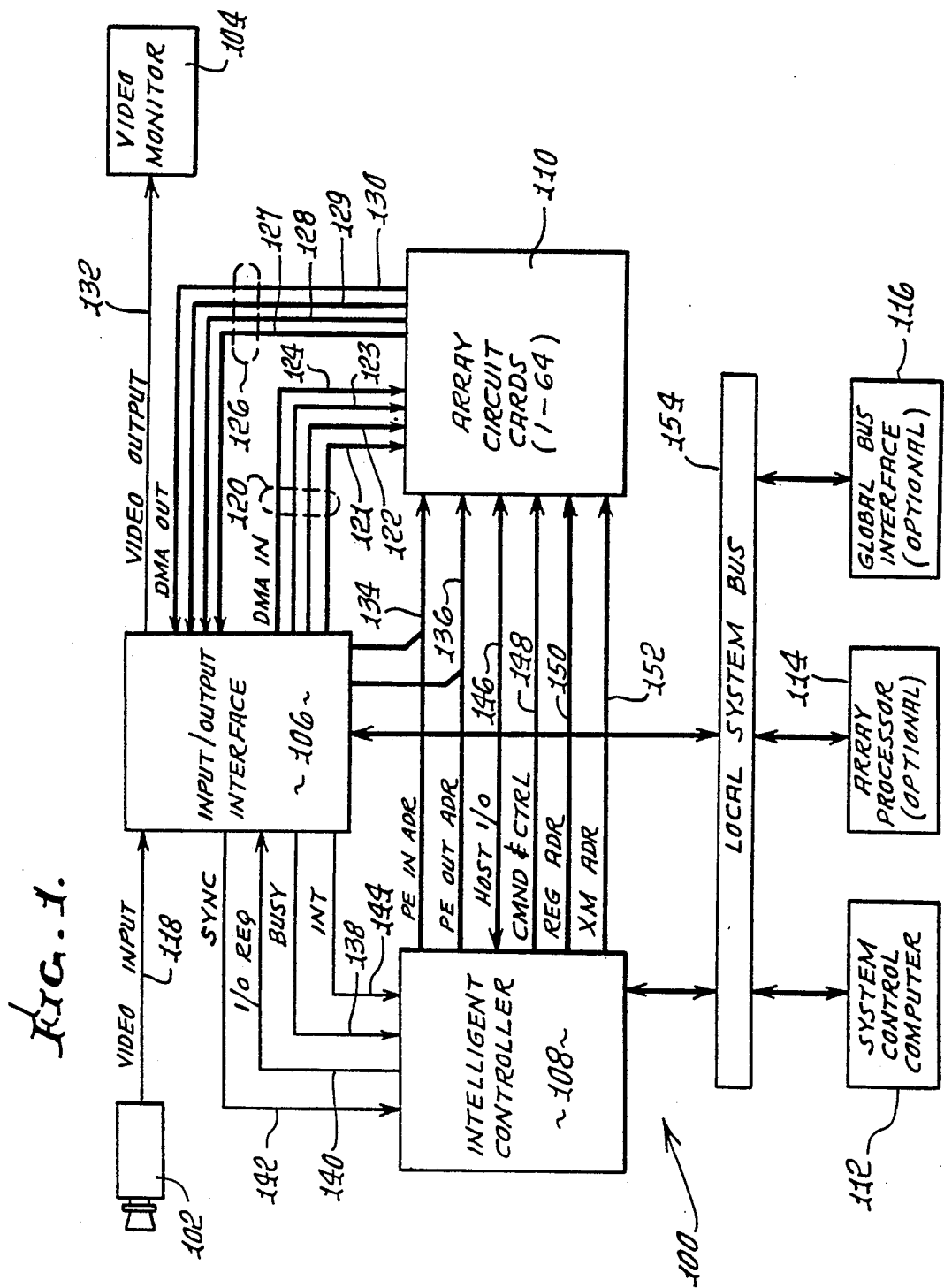

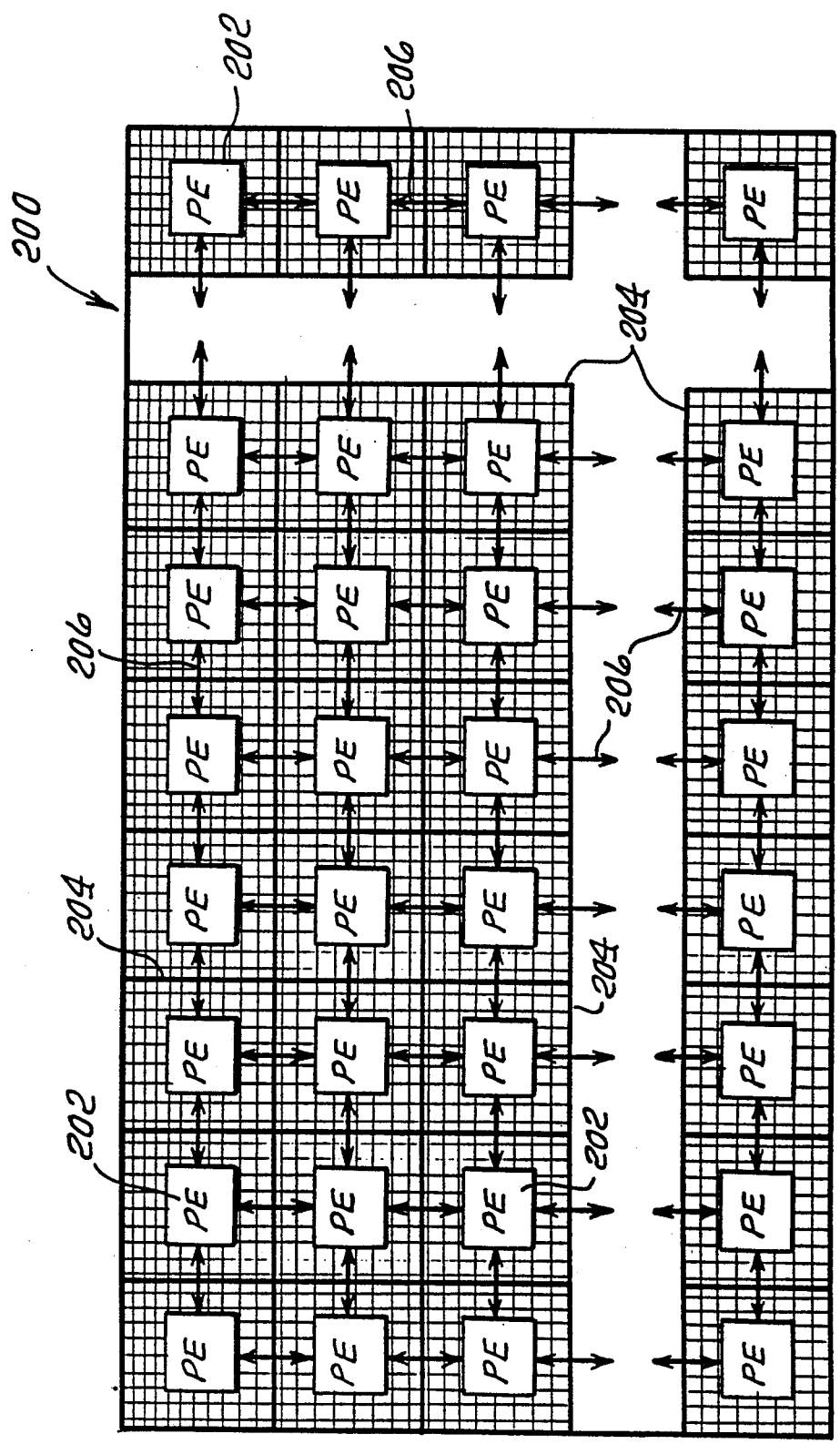

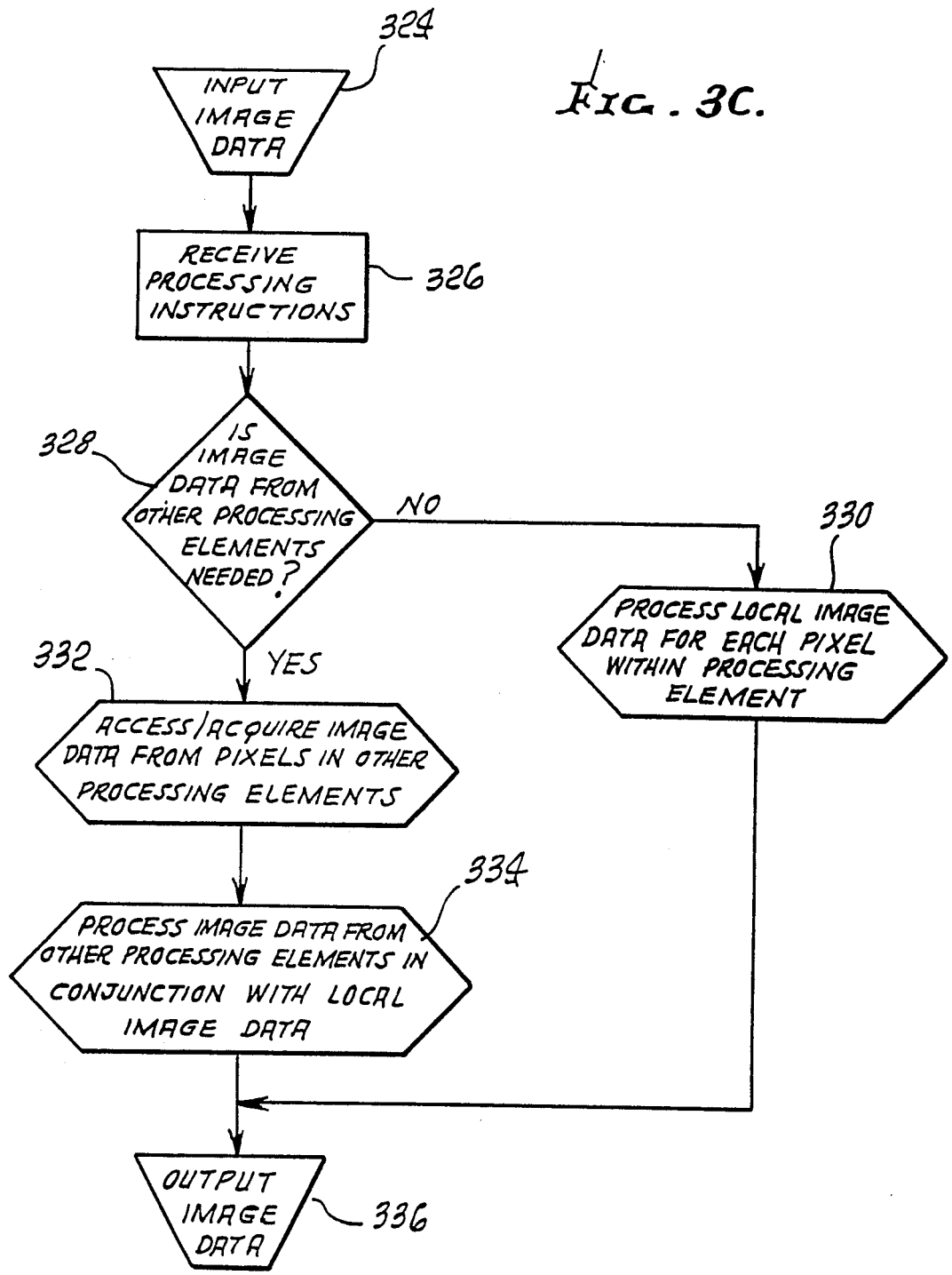

FIG. 5.

PROCESSING ELEMENT INSTRUCTION SET

| OPERATION | C9 | C8 | C7 C6 | C5 C4 | C3 C2 C1 C0 |
|---|---|---|---|---|---|
| D: = 0 (LOGIC ZERO) | | | | | 0 0 0 0 |
| D: = 1 (LOGIC ONE) | | | | | 0 0 0 1 |
| D: = SM (ALU SUM) | | | | | 0 0 1 0 |
| D: = $\overline{SM}$ | | | | | 0 0 1 1 |
| D: = CY (ALU CARRY) | | | | | 0 1 0 0 |
| D: = $\overline{CY}$ | | | | | 0 1 0 1 |
| D: = MX (ALU MUX) | | | | | 0 1 1 0 |
| D: = $\overline{MX}$ | | | | | 0 1 1 1 |
| D: = N (NORTH) m-1,n' | | | | | 1 0 0 0 |
| D: = S (SOUTH) m+1,n' | | | | | 1 0 0 1 |
| D: = E (EAST) m,n+1 | | | | | 1 0 1 0 |
| D: = W (WEST) m,n-1 | | | | | 1 0 1 1 |
| D: = C (CARRY REG) | | | | | 1 1 0 0 |
| D: = X (EXT MEM) | | | | | 1 1 0 1 |
| D: = IR, IR: = >> (IN REG) | | | | | 1 1 1 0 |
| NO REG FILE WRITE | | | | | 1 1 1 1 |
| C: = CY (ALU CARRY) | | | | 0 0 | |
| C: = BUS (INT BUS) | | | | 0 1 | |
| C: = RB (REG FILE B) | | | | 1 0 | |
| C: = C (NOOP) | | | | 1 1 | |
| M: = 1 (LOGIC ONE) | | | 0 0 | | |
| M: = BUS (INT BUS) | | | 0 1 | | |
| M: = RA (REG FILE A) | | | 1 0 | | |
| M: = M (NOOP) | | | 1 1 | | |
| OR: = << (OUT REG SHFT) | | 0 | | | |
| OR: = OR (NOOP) | | 1 | | | |
| I = 0 (NO INVERSION) | 0 | | | | |
| I = 1 (INVERT ALU A INPUT) | 1 | | | | |

<u>ARITHMETIC EQUATIONS:</u>

$SM = (A \oplus I) \oplus (B \cdot M) \oplus C$ $CY = [(A \oplus I) \cdot (B \cdot M)] + [A \oplus I \cdot C] + [(B \cdot M) \cdot C]$ $MX = [(A \oplus I) \cdot \overline{M}] + (B \cdot M)$ <u>LOGICAL EQUATIONS:</u>

$MX = \overline{A}$ (IF I=1 AND M=0)

$CY = A + B$ (IF I=0, C=1, AND M=1)

$CY = A \cdot B$ (IF I=0, C=0, AND M=1)

$SM = A \oplus B$ (IF I=0, C=0, AND M=1)

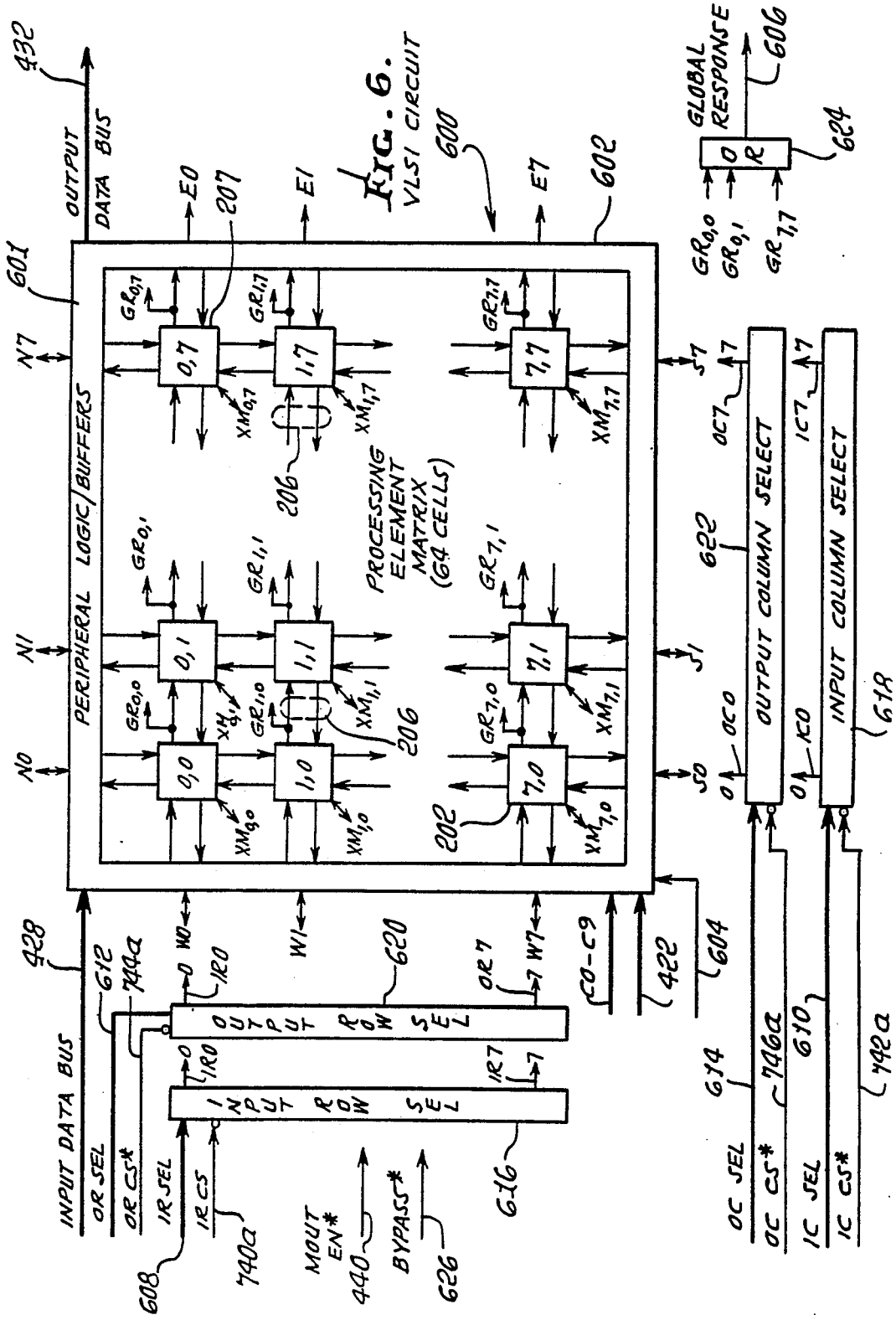

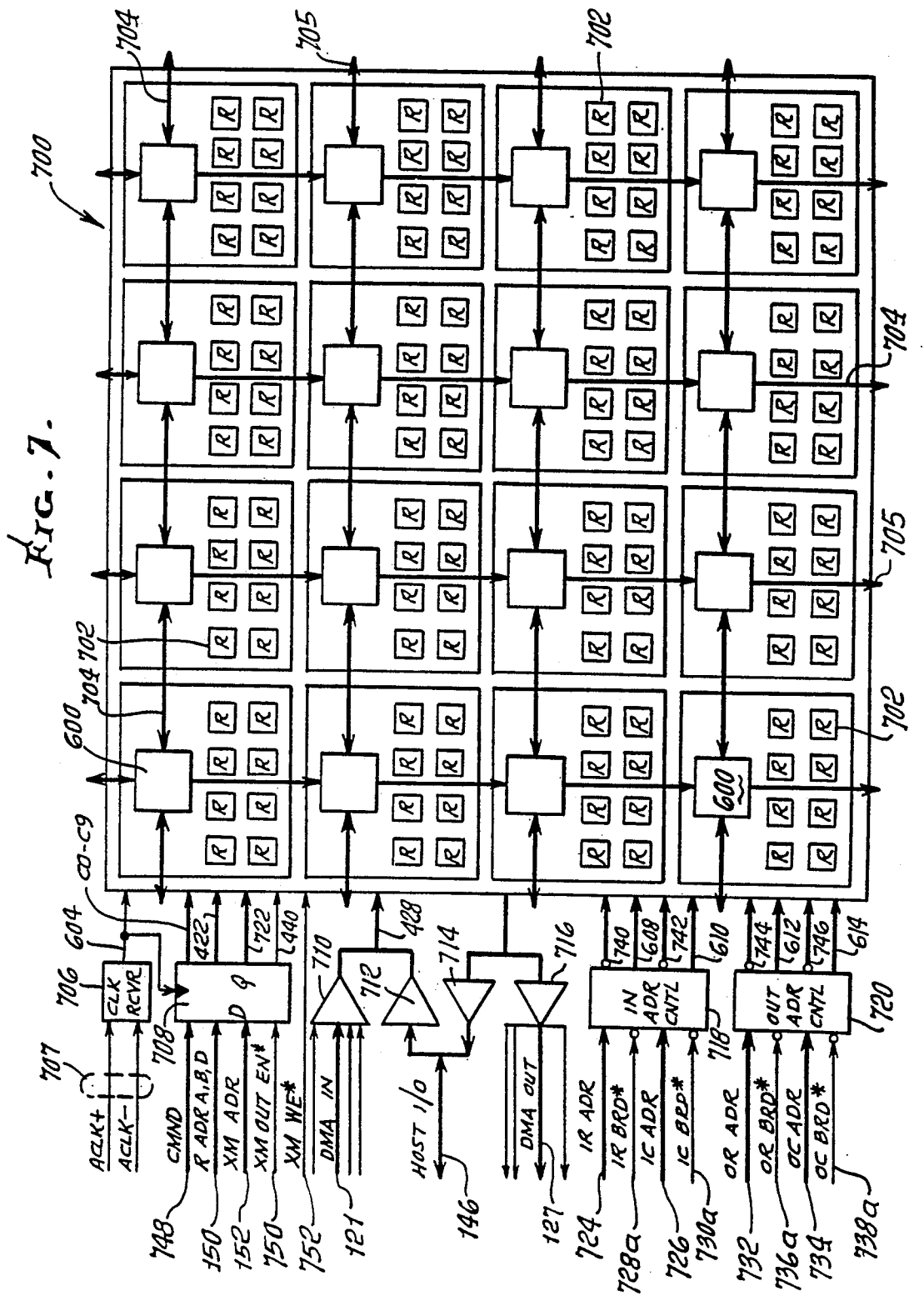

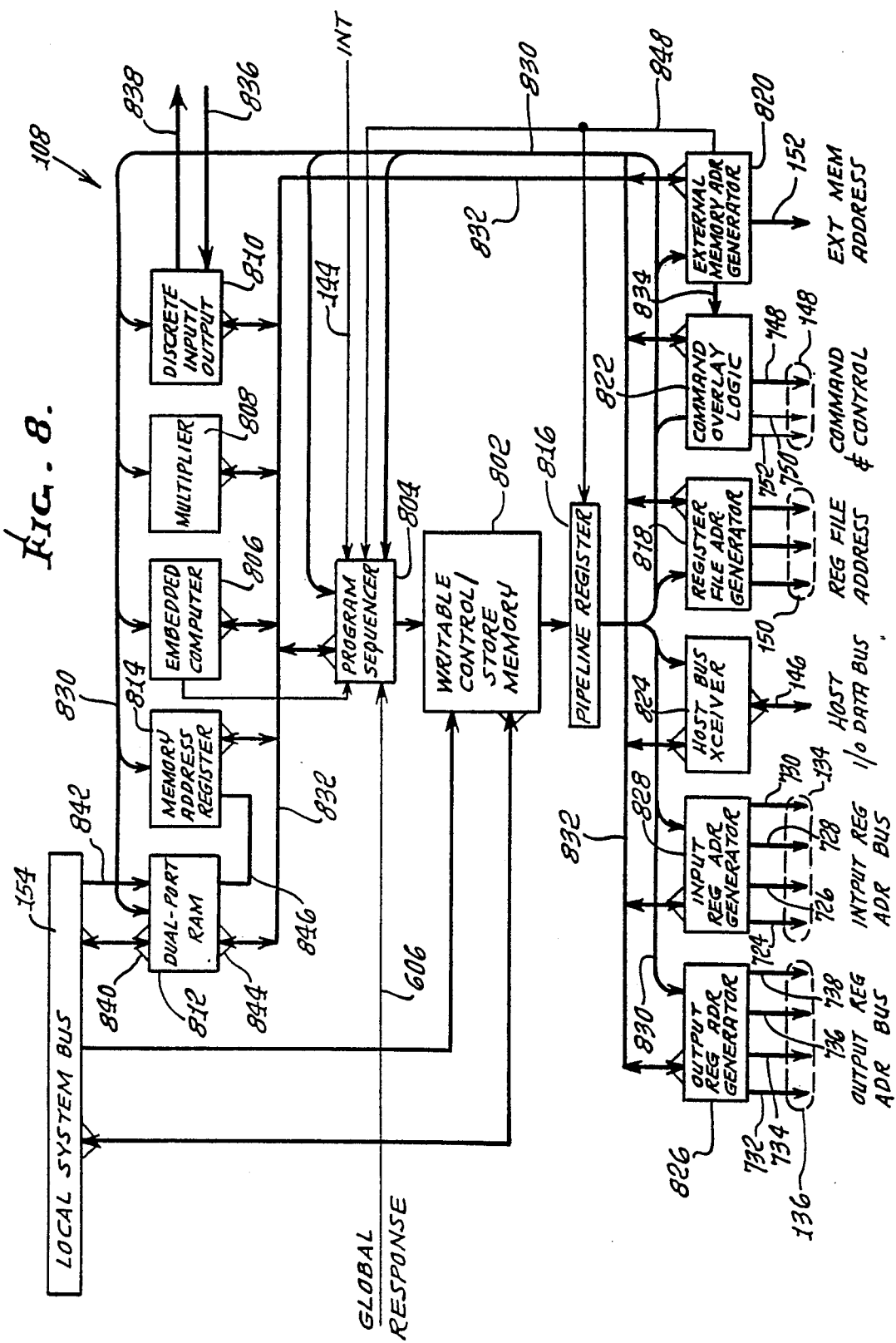

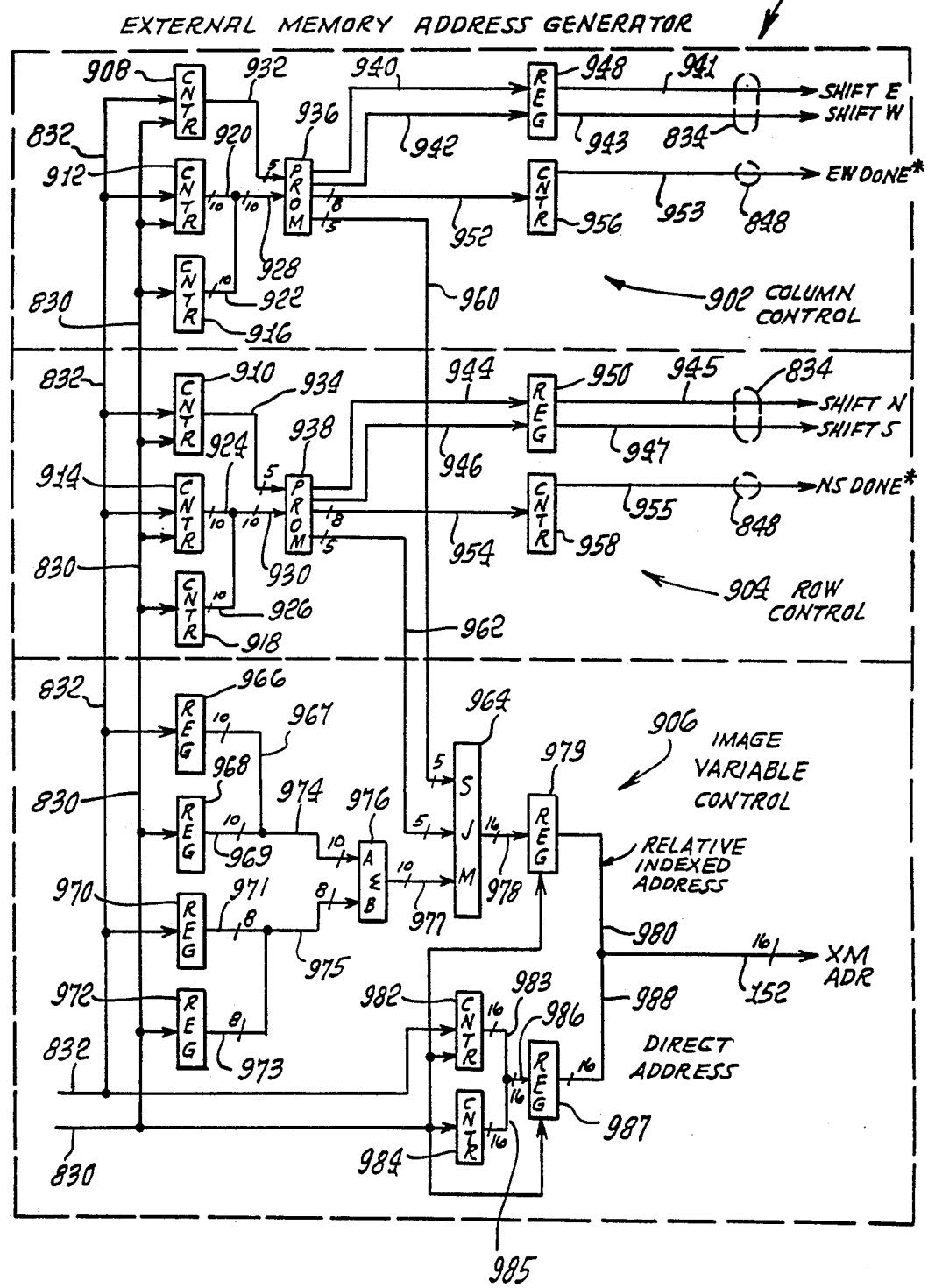

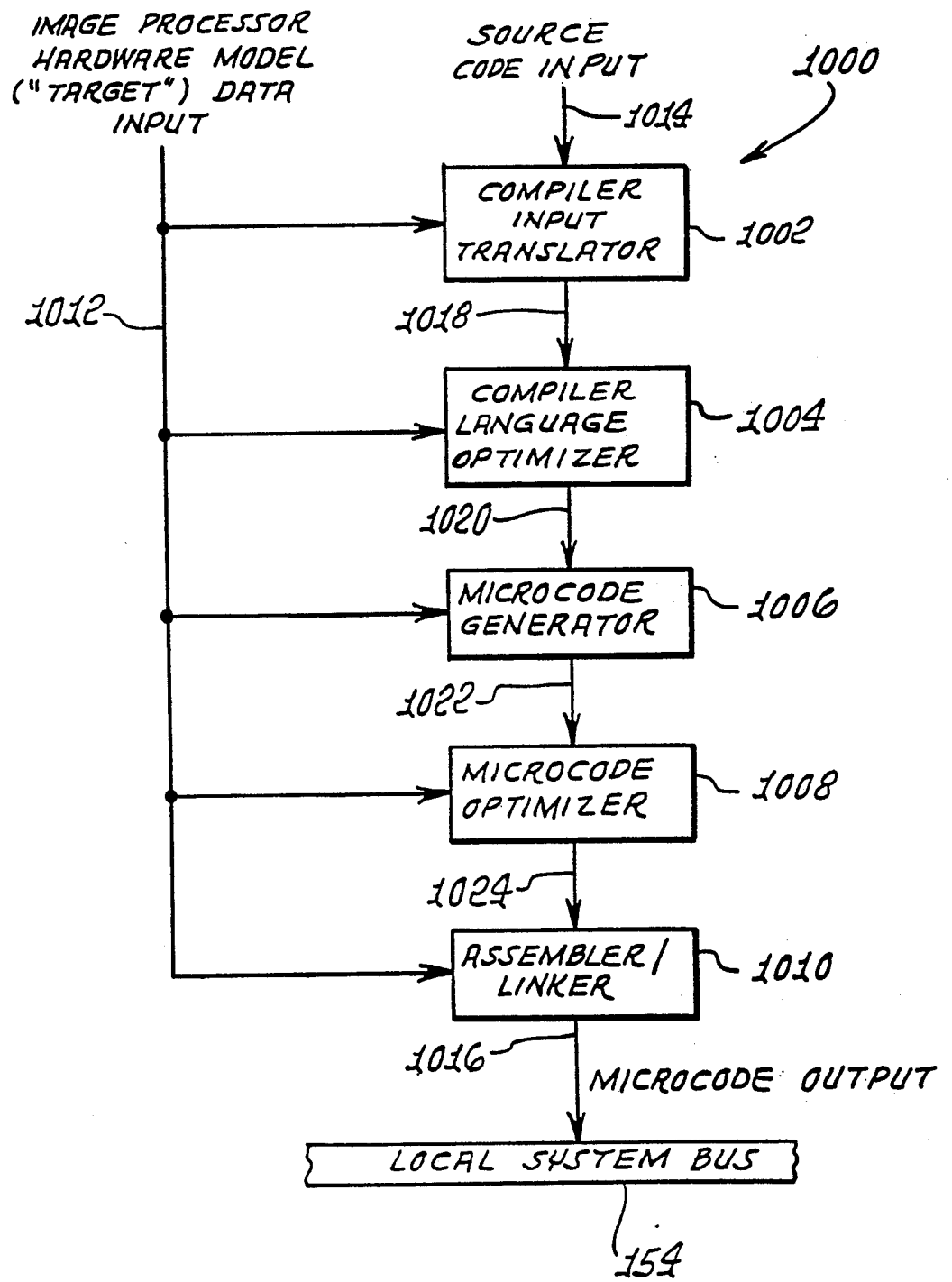

MASSIVELY PARALLEL DIGITAL IMAGE DATA PROCESSOR USING PIXEL-MAPPED INPUT/OUTPUT AND RELATIVE INDEXED ADDRESSING

BACKGROUND OF THE INVENTION

The present invention relates to parallel data processing systems. More particularly, the present invention relates to parallel data processors of the type comprised of a two-dimensional array of interconnected processing elements which perform arithmetic and logical data processing functions for image processing.

Parallel data processor systems are well adapted to providing effective image processing capabilities. Such parallel image processors typically comprise a two-dimensional matrix-like array of identical digital processing elements. Each processing element is capable of performing a variety of relatively simple logical and arithmetic operations on the data it receives. Each processing element is in turn capable of communication with one or more of its neighboring processing elements. When all processing elements perform their respective simple logical or arithmetic operations on their respective data, the cumulative effect is a much larger and more sophisticated logical/arithmetic operation. Image data may be mapped into the arra of processing elements such that each processing element only receives a portion of the total image data. Thus, sophisticated image processing can be performed upon the image by having the numerous processing elements each perform their own native-mode processing on their respective portions of the overall image. This can have significant speed and cost advantages over a more complex CPU which processes the image data serially.

Image processors frequently employ multiple-instruction/multiple-data (MIMD) class processors. Such processors are complex and nonredundant, i.e., a separate program must be written for each processing element and then the programs must be integrated with one another. This integration process includes the very complex task of ascertaining and programming the absolute addresses of all pixel data needed to be accessed by each individual processing element. This results in long development cycles due to the large number of different complex programs required to be written for a MIMD system. This programming bottleneck is complicated even further when additional processing elements are added to expand a system since more programs must be written and the existing ones typically must be substantially modified. Furthermore, the separate programs must be reintegrated, including redetermining the absolute addresses of pixel data needed by each program. Moreover, the programming associated with interprocessor communications severely limits the efficiency of MIMD processors as the number of processing elements increases.

Single-instruction/multiple-data (SIMD) class procsessors have also been employed in parallel processing systems. A SIMD class processor is much less complex than a MIMD class processor because only a single program need be written for simultaneous execution by all processing elements. However, the very complex task remains of programming the addresses of all pixel data needed to be accessed by the processing elements during program execution, plus reprogramming the addresses when processing elements are added to expand the system.

A further problem in applying massively parallel processing (MIMD and SIMD) to image processing relates to problems in the efficient routing of image data through the parallel processing system. The digital data on which the processing elements operate is typically received and sent out on separate input and output data buses. The data buses in a typical SIMD image processor are "bit-plane mapped," i.e., single bits representing portions of multiple pixels within the image are available in parallel. However, most sensors which supply images to be processed, as well as most display devices which display such images, operate with "pixel-mapped" data, i.e., data wherein all bits representing a single pixel within the image are available in parallel. Therefore, bit-plane mapped SIMD image processors require dedicated hardware, programming and/or processing time to convert the data from pixel format to bit-plane format and back again. This in turn increases the cost and reduces the speed of such conventional SIMD image processors.

Accordingly, parallel image processing systems have failed to fully exploit the cost and speed efficiencies potentially available in massively parallel architecture and suffer from complex user programming problems.

SUMMARY OF THE INVENTION

An object of the present invention is to provide a massively parallel data image processor which provides rapid simultaneous processing of an entire two-dimensional image without requiring complex programming.

A further object of the present invention is to provide a parallel data image processor capable of continuous image processing across the entire two-dimensional image.

A further object of the present invention is to provide a parallel data image processor capable of inputting/outputting image data in a pixel-mapped format directly compatible with image sensors and image display devices.

In a preferred embodiment, the present invention provides a parallel data image processor having an input/output interface, a processing element matrix and an intelligent controller. The input/output interface accepts image data in analog form in pixel format and digitizes it, maintaining the pixel format. This digitized image data, in parallel form, is transferred by way of a parallel data bus to the processing element matrix. Once the data has been processed within the processing element matrix, it is transferred back to the input/output interface on another parallel data bus. The input/output interface then converts this digital image data back into analog form before sending it to an analog image display device.

The processing element matrix consists of a matrix of processing elements which share a parallel input data bus and a parallel output data bus. Image data from the input data bus is loaded into the appropriate processing element as determined by commands and addresses received from the intelligent controller. The processing elements are memory-mapped into the internal address space of the internal computer within the intelligent controller. This allows the intelligent controller to enable the desired processing element by providing a simple address signal based on the row and column in which the processing element is located within the matrix. The parallel image data, once loaded into the processing element, is internally converted to serial form and stored within the memory of the processing element. The internal operating memory of the processing element consists of a register file which has an input port and two output ports which may be operated and addressed independently and simultaneously. The memory of the processing element is expandable through the use of external random-access memories. The processing element then arithmetically and/or logically processes the image data according to its processing instructions received from the intelligent controller. Once the processing element has processed the image data, the resulting serial data is converted back into parallel form and placed upon the output data bus, in pixel format, for transfer back to the input/output interface.

The intelligent controller controls each processing element within the processing element matrix by providing appropriate instructions for inputting data, storing data, manipulating and processing data, and outputting data. When instructing a processing element to input data, the intelligent controller may instruct the processing element to input data from the input data bus, its external memory, or from external memory assigned to another processing element elsewhere within the matrix. When instructing the processing element to input data from external memory assigned to another processing element within the matrix, the intelligent controller provides the processing element with a relative indexed address. This relative indexed address tells the processing element how many pixel rows and how many pixel columns away is the desired target data with respect to the currently specified base pixel.

When instructing a processing element to store data, the intelligent controller may instruct that the data be stored in the processing element's register file or its external memory. When instructing a processing element as to its manipulation or processing of image data, the intelligent controller may instruct the processing element to transfer data from its external memory to another processing element which had received a relative indexed addressing instruction seeking that data, or it may instruct the processing element to arithmetically and/or logically process the data. When instructing a processing element to output data, the intelligent controller enables the appropriate processing element by way of its row and column based address and instructs that its data be placed on the output data bus.

By inputting the digitized image data into the processing element matrix, the two-dimensional image is mapped into the two-dimensional processing element matrix. This subdivides the image into a number of rectangular regions equal to the number of processing elements within the processing matrix. Once the image data has been inputted into the matrix, each processing element simultaneously operates on its respective image data. Each processing element is connected to its surrounding processing elements allowing for the sharing of image data by the processing elements when given relative indexed addressing instructions by the intelligent controller. This causes the physical processing element matrix to become a "virtual" processing element matrix whose logical dimensions appear larger than the physical dimensions.

Rapid processing of an entire two-dimensional image is achieved by operating all processing elements simultaneously. A single-instruction/multiple-data (SIMD) class processor is constructed by having each processing element operate with the same program. Thus, with only one program required, application programming is greatly simplified.

The interconnectivity of each processing element with its neighboring processing elements makes the parallel data image processor of the present invention capable of continuous image processing across the entire two-dimensional image since image data assigned to any processing element is available for processing by any other processing element. Furthermore, by inputting, storing, processing and outputting the image data while at all time maintaining the pixel-mapped format makes the parallel data image processor of the present invention directly compatible with image sensors and image display devices.

Further features and advantages of the present invention will be appreciated from the following detailed description of the invention.

BRIEF DESCRIPTION OF THE DRAWINGS

FIG. 1 is a functional block diagram of a typical image processing system using the image processor of the present invention.

FIG. 2A illustrates conceptually the matrix of processing elements within the image processor of the present invention into which the two-dimensional image is mapped.

FIG. 3C is a flowchart of the image processing instructions for the image processor of the present invention.

FIG. 5 is a table listing the binary code forming the instruction set for the processing element of FIG. 4.

FIG. 6 is a functional block diagram illustrating the placement of a matrix of processing elements of FIG. 4 onto a very-large-scale integration circuit and the on-chip circuitry used for communicating therewith.

FIG. 7 is a functional block diagram illustrating the placement of an array of a plurality of the very-large-scale integration circuits of FIG. 5 onto a circuit board along with associated external memory elements and the interface circuits needed for communicating with the array.

FIG. 8 is a functional block diagram of the intelligent controller circuitry for the image processor of the present invention.

FIG. 9 is a functional block diagram of the external memory address generator within the intelligent controller circuit of FIG. 8.

FIG. 10 is a functional block diagram of a retargetable cross-compiler for providing microcode programming for the intelligent controller circuit of FIG. 8.

DETAILED DESCRIPTION OF THE PREFERRED EMBODIMENT

Figure 2B:
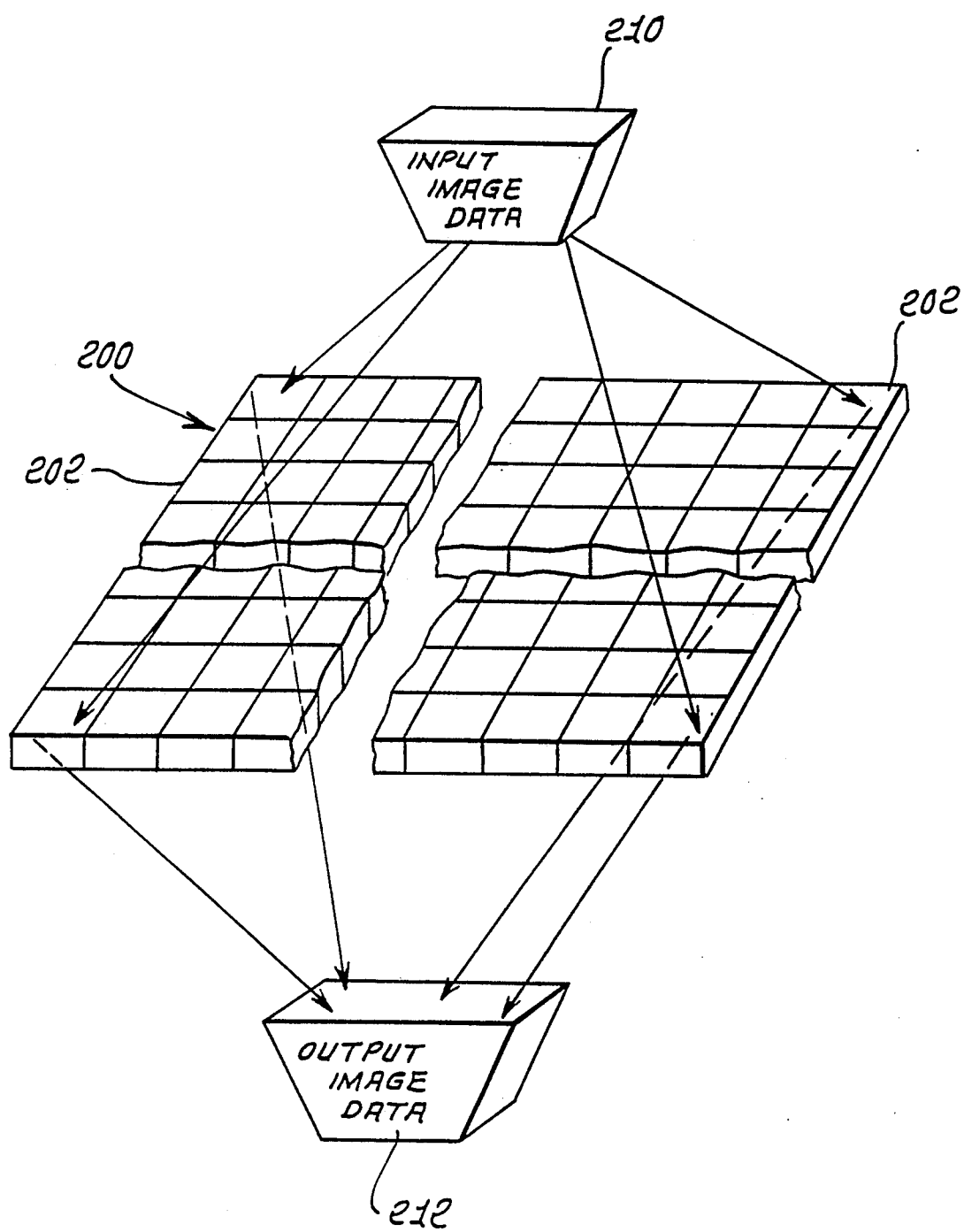
FIG. 2B is a flowchart of the operation of the image processor of the present invention.

FIG. 1 is a functional block diagram of a parallel data image processing system 100. The major elements comprise a video sensor 102, video monitor 104, input/output interface 106, intelligent controller 108, image processing array 110, system control computer 112, optional array processor 114, and an optional global bus interface 116.

The heart of the system is the image processing array 110 and is described in detail below. The array 110 consists of one to 64 array circuit cards which process digital image data received from the input/output interface 106.

The interface 106 receives analog data 118 from a sensor 102, and digitizes the data 118 with an analog-to-digital converter ("ADC"). The interface 106 inputs the digitized data into the array 110 via direct-memory-access ("DMA") input lines 120. Once processed within the array 110, the processed data returns to the interface 106 from the array 110 via DMA output lines 126. The interface 106 converts the processed data into analog video with a digital-to-analog converter ("DAC") and outputs the video data 132 to a video monitor 104 for display. The DMA input lines 120 and DMA output lines 126 each comprise four 16-bit buses 121-124, 127-130 which move data into and out of, respectively, the array 110 at rates of up to 200 megabytes per second. The 4 DMA buses 121-124, 127-130 are each connected to separate quadrants of a single array card 110, to maximize the effective input/output rate of the array.

While the interface 106 is transferring data to and from the array 110, it controls the destinations and sources of the data to be transferred via the processing element ("PE") input and output address lines ("PE IN ADR", "PE OUT ADR") 134, 136, respectively. During data transfer while the interface 106 is driving the address lines 134, 136, the "BUSY" line 138 is active. If the intelligent controller 108 needs to take over control and communicate with the array 110, the controller 108 activates the input/output request line ("I/O REQ") 140. When the interface 106 has completed its data transfers it deactivates the BUSY signal 138, surrendering control of the address lines 134, 136 to the controller 108.

The interface 106 further communicates with the controller 108 by way of a synchronization ("SYNC") signal 142 and an interrupt ("INT") signal 144. The interface 106 generates the INT signal 144 to inform the controller 108 when the interface 106 has finished extracting data from the output registers 412 (see FIG. 4) within the array 110 and filled up the input registers 410 (see FIG. 4) within the array 110. Upon receiving the INT signal 144, the controller 108 causes the array 110 to provide new data at its output registers 412 and store the data in its input registers 410 within its internal memory. The interface 106 generates the SYNC signal 142 to inform the controller 108 when the interface 106 has finished inputting a new frame of video data into the array 110 and that the image processing program must be restarted by the controller 108. The interface 106 communicates with the remainder of the system 100 by way of the local system bus 154.

When the intelligent controller 108 communicates with the array 110, it does so via the host input/output data bus ("HOST I/O") 146 and the PE IN/OUT ADR lines 134, 136. When controlling the execution of the image processing programs by the array 110, the controller 108 does so via the command and control lines ("CMND & CTRL") 148, and external memory address lines ("XM ADR") 152.

The system control computer 112 is a standard microprocessor-based computer, providing man-machine interface functions, control store download functions, and intrasystem control coordination among the various elements of the overall image processing system 100. The computer 112 communicates with the controller 108 and interface 106 via a local system bus 154 which is a standard VME bus. The system control computer 112 may include an ADA-based compiler, into which an ADA-based program may be inputted for compiling the source code to be sent to the intelligent controller 108. In an alternative preferred embodiment, the system control computer 112 includes a retargetable cross-compiler, discussed in more detail below in relation to FIG. 10, thereby allowing programming to be done in any of several selectable languages, e.g., "C," ADA or FORTRAN.

The optional array processor 114 may be included within the system to execute general purpose, post-processing serial algorithms on the data contained in the array 110, thereby leaving the controller 108 free to execute its parallel algorithms via the array 110. The optional array processor 114 also communicates with the controller 108 via the local system bus 154.

The optional global bus interface 116 may be included to connect the local system bus 154 with an intersystem bus such as MIL-STD-1553B or Ethernet.

FIG. 2 illustrates conceptually the matrix 200 of processing elements 202 into which a two-dimensional image is mapped. The two-dimensional image to be processed is subdivided into a number of rectangular regions equal to the number of processing elements ("PE") 202 within the matrix 200. The data representing each rectangular region from the image (digitized by the input/output interface 106 as described above) is inputted into a corresponding processing element 202. This mapping technique is known as "crinkle-mapping."

The image data is inputted to the processing elements 202, processed and returned therefrom in "pixel" format, as opposed to "bit-plane" format. (Pixel format provides in parallel all data bits representing a single pixel, while bit-plane format provides in parallel single bits representing portions of multiple pixels.) Since most image sensors and display devices operate with pixel formatted data, pixel formatted data transfer and processing provides maximum efficiency in that, unlike bit-plane formatted processing, no special hardware or processing time is required to convert pixel formatted data to bit-plane format, and vice versa (such conversion being generally known as "corner-turning").

FIG. 2B is a simple flowchart of the operation of the image processor of the present invention with respect to routing of image data. As shown in FIG. 2B and discussed above, the first basic step 210 is to input the image data. This inputted image data is then distributed to the appropriate processing elements 202 within the matrix 200. The last basic step 212 is to output the image data after it has been processed by the processing elements 202 within the matrix 200.

To further maximize the efficiency of the system, the processing elements 202 are memory-mapped into the address space of the intelligent controller 108, which is described in detail below in the description for FIG. 8. Thus, the pixel formatted data is readily available on shared input and output data buses and each processing element 202 may be accessed by way of a simple row/column-based address.

Figure 3A:
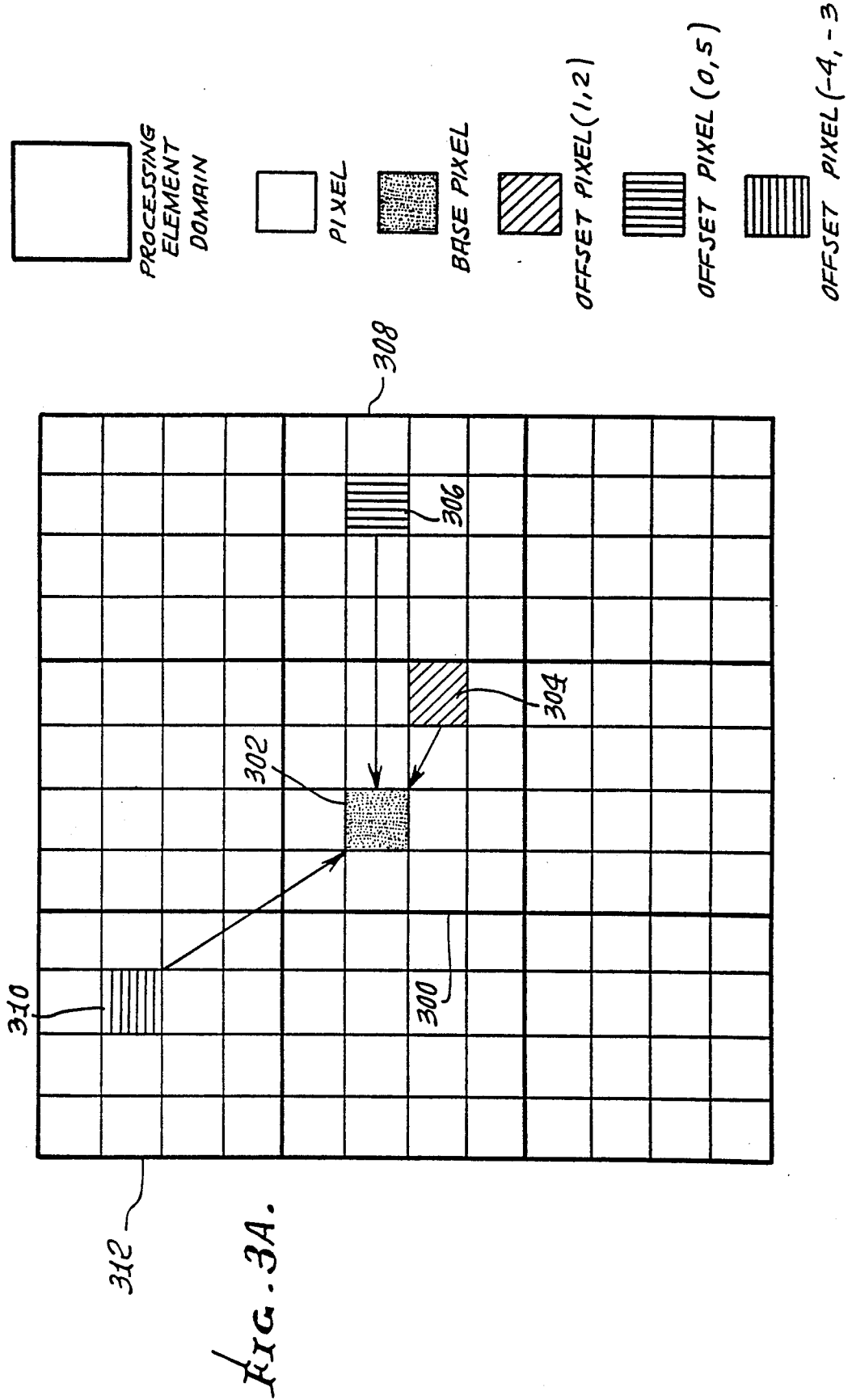
FIG. 3A illustrates graphically the concept of relative indexed addressing provided by the present invention.

Once the image data has been inputted into the matrix 200 of processing elements 202, it is accessible for processing not only by its own corresponding processing element 202, but also by any processing element 202 within the matrix 200. This unlimited data accessibility allows for "seamless" algorithm execution on entire images across processing element boundaries 204, and is possible due to the connectivity 206 between adjacent processing elements 202. Such seamless processing is achieved by providing on-demand relative indexed addressing, shown pictorially in FIG. 3A. Data representing any pixel offset from a base pixel 302 may be accessed by the base processing element 300, regardless of whether it is a pixel 304 contained within the same base processing element 300, a pixel 306 contained within an adjacent processing element 308, or a pixel 310 contained within a non-adjacent processing element 312. Such offset pixel data is accessed merely by specifying the numbers of rows and columns the desired pixel is offset from the base pixel 302. This relative indexed addressing, along with crinkle-mapping, causes the matrix 200 of processing elements 202 to appear to the user-programmer to have the same dimensions as the image being processed. Further, this relative indexed addressing and crinkle-mapping create "virtual" processing elements which appear to have virtually unlimited dimensions larger than those of the actual processing elements 202, thereby facilitating development of application programs.

Application program development is further simplified by the fact that the image processor of the present invention is a single-instruction/multiple-data ("SIMD") class processor, meaning that only a single basic program need be written for simultaneous execution by all processing elements 202. This is in contrast to multiple-instruction/multiple-data ("MIMD") class processors which require separate programs for each processing element 202, which must then be integrated with one another. Furthermore, with MIMD class processors, as more processing elements 202 are added the separate programs must be radically modified and reintegrated, and the additional overhead processing associated with the additional interprocessor communications severely limits the efficiency of the processor.

Once placed into this matrix 200 of processing elements 202, all image data are simultaneously processed by their respective processing elements 202. Thus, although each processing element 202 is a relatively simple computational device, extremely high data processing throughputs are achieved by operating thousands of processing elements 202 simultaneously in parallel. Moreover, by fabricating a large number of processing elements 202 on a single, custom very-large-scale integration ("VLSI") circuit, image data processing matrices 200 as in the present invention are practical and realizable within cost, reliability, volume, power and logistical constraints.

Figure 3B:
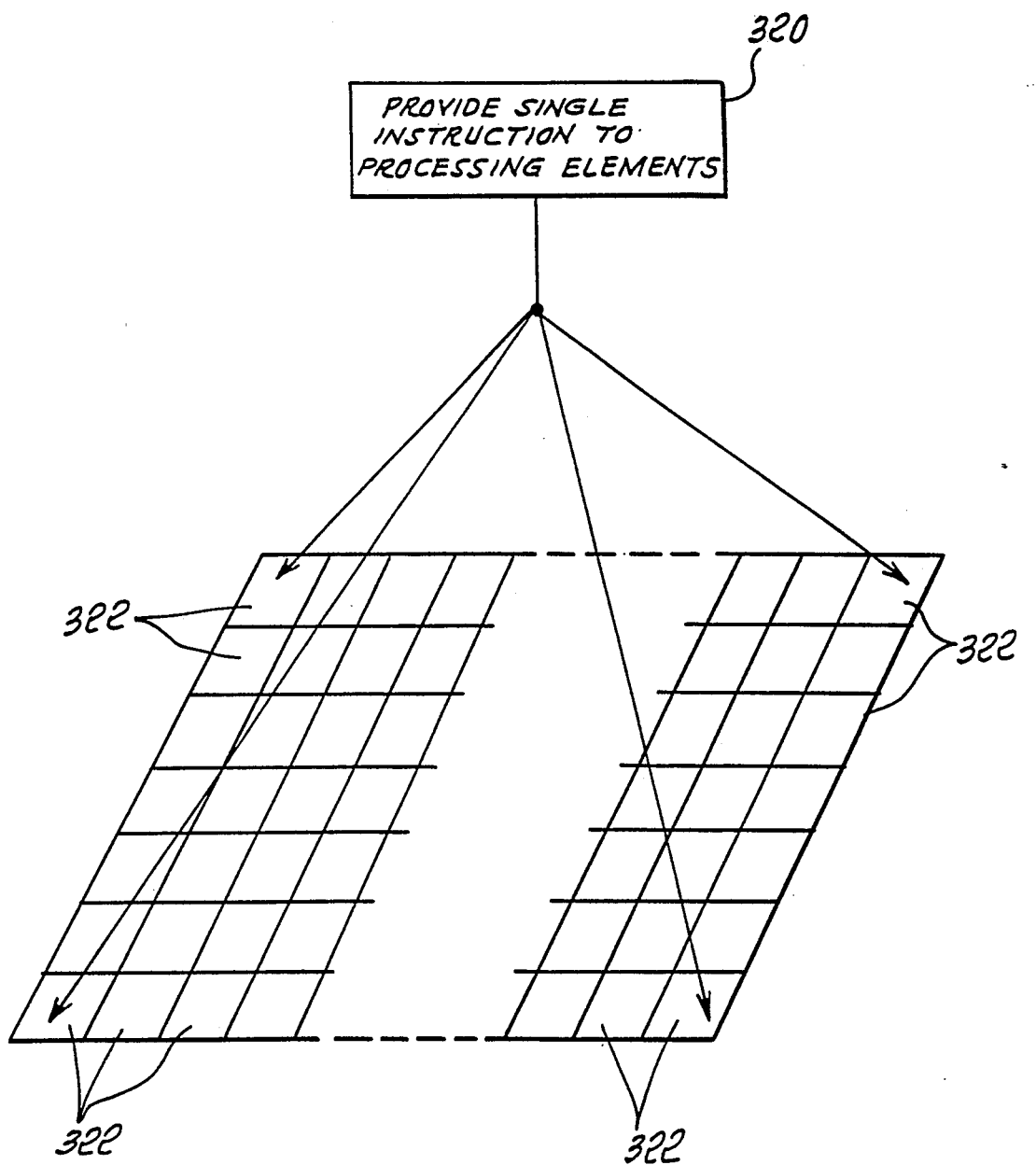
FIG. 3B is a flowchart representing the distribution of processing instructions within the image processor of the present invention.

FIG. 3B is a simple flowchart of the operation of the image processor of the present invention with respect to providing processing instructions to the individual processing elements 202. As an SIMD type of processor, the first step 320 is to provide the same processing instructions to each processing element 202. Each processing element 202 then performs its set 322 of processing operations.

FIG. 3C is a flowchart of the set 322 of image data processing operations performed simultaneously by all processing elements 202 within the matrix 200. Once the first steps 324, 326 of inputting the image data and receiving the processing instructions are completed, the next step 328 is that of determining whether image data from other processing elements 202 elsewhere within the matrix 200 is required. If such other data is not required, then the next step 330 is processing of the image data for each pixel within that particular processing element 202. However, if such other image data is required, then the next step 332 is to access and acquire the image data needed from the appropriate pixels within the other processing elements 202 within the matrix 200. As discussed above, accessing image data from pixels located in another processing element 202 is done by specifying the numbers of rows and columns the desired pixel is offset from the then current base pixel 302 within the base processing element 300. Once the desired data has been accessed, it is acquired by merely copying that data into the base processing element 300. Thus, image data from pixels to the north, south, east and west may be accessed and acquired by the base processing element 300.

Once this other image data has been accessed and acquired from other processing elements 202, the next step 334 is to process this newly acquired image data in conjunction with the local image data. Once the processing steps 330, 334 are done, all that then remains is the last step 336 of outputting the image data.

It will be readily appreciated by one skilled in the art that the foregoing use of the term "processing" with respect to the image data may include, among other things, processes which perform image enhancement or provide for pattern recognition. As an example, the advantageous result of having the above-described capability of relative indexed addressing is readily apparent in the case of image enhancement. After receiving their image data, all processing elements 202 begin executing their processing instructions. These instructions may require a base processing element 300 to operate on image data pertaining to a pixel located within another processing element 202 to the north, south, east or west. With relative indexed addressing the base processing element 300 need not request absolute address information from the controller 108, but may simply address the necessary pixel directly based upon its location relative to the base processing element 300. This is very advantageous in image enhancement processing since image data must normally be processed in conjunction with the surrounding image data in order to provide the proper enhancement.

Figure 4:
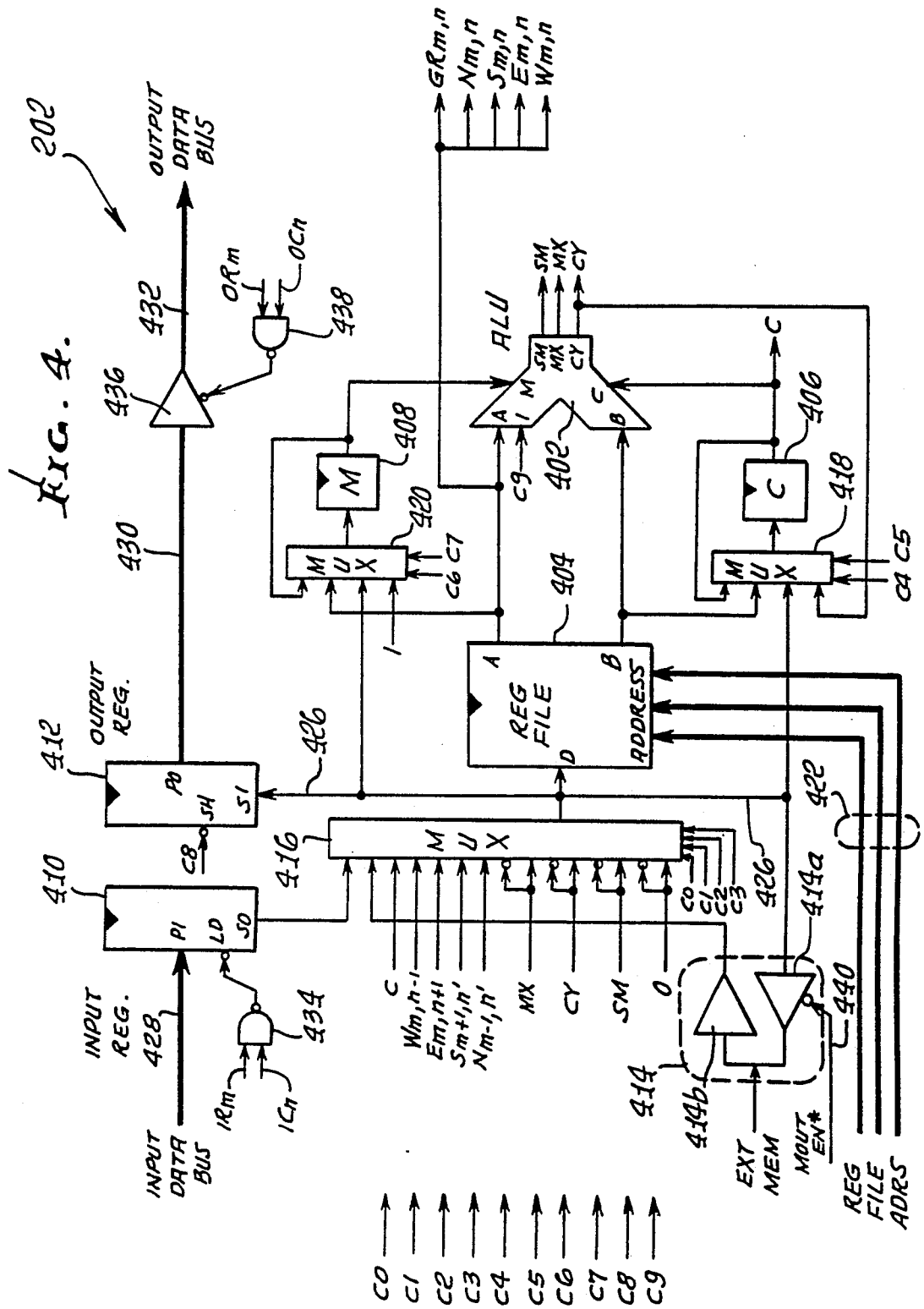
FIG. 4 is a functional block diagram of the individual processing element used in the present invention.

FIG. 4 is a functional block diagram of the individual processing elements 202 used in the present invention.

The major components comprising a processing element 202 are a 1-bit arithmetic-logic unit ("ALU") 402, a 64-bit, triple-ported register file 404, a 1-bit "C" register 406, a 1-bit "M" register 408, a 16-bit input register 410, a 16-bit output register 412, a 1-bit wide, bi-directional port 414 to external memory, and various multiplexers 416, 418, 420 to perform register transfer operations.

The instruction set for the internal command signals for the processing element 202 is shown in FIG. 5. The command signals C0-C9, control the processing element 202 by controlling the register file multiplexer 416, the C register multiplexer 418, the M register multiplexer 420, the output register 412, and the ALU 402. The five separate fields shown in FIG. 5 (D "Select," C "Select," M "Select," Output Register Control, and ALU Control) are all functionally independent, thereby allowing five separate operations to occur within the processing element 202 during a single clock cycle.

The 1-bit ALU 402 performs all of the arithmetic and logical functions indicated by the appropriate equations at the bottom of FIG. 5. The ALU 402 receives 1-bit "A" and "B" outputs from the register file 404, the outputs of the C register 406 and M register 408, and a command signal C9 to generate the sum SM, carry CY, and multiplex MX outputs. As shown by the equations in FIG. 5, the logical operations involving one or two operands are derived from the arithmetic equations of the ALU 402.

The register file 404 supplies the A and B operands to the ALU 402. These operands are individual bits read out serially from two data words within the register file 404 that are currently being processed. The register file 404 receives its data words via its "D" port. The register file 404 has separate, functionally independent registers for its input port D and its output ports A, B. These separate registers are addressed independently by three sets of register file address lines 422. Thus, the register file 404 may perform two "read" operations at its A and B ports and one "write" operation at its D port simultaneously during a single clock cycle.

Inputs to the D port of the register file 404 come from the register file multiplexer 416, which in turn receives its inputs from a variety of sources. As shown in FIG. 4, these sources comprise: a logical "0" and its inverse a logical "1", the sum output SM of the ALU 402 and its inverse, the carry output CY of the ALU 402 and its inverse, the multiplex output MX of the ALU 402 and its inverse, the output C from the C register 406, external memory by way of the bi-directional port receiver 414b, the serial output SO of the input register 410, and the serial data outputs $N_{m-1,n}$, $S_{m+1,n}$, $E_{m,n+1}$, $W_{m,n-1}$, from the processing elements 202 neighboring on the north, south, east and west, respectively. (The designators "m" and "n" represent the row and column numbers, respectively, of the currently referenced, or local, processing element 202.)

If the command lines C0-C3 to the register file multiplexer 416 are all at a logical 1, then no write operation is performed at the D port of the register file 404 (see FIG. 5). Also, if either the C register multiplexer 418 or the M register multiplexer 420 select the internal bus 426, then no write operation is performed at the D port of the register file 404.

The A output of the register file 404, besides going to the ALU 402, also goes to the processing elements 202 neighboring on its north, south, east and west as one of the four neighboring processing element signal $N_{m,n}$, $S_{m,n}$, $E_{m,n}$, $W_{m,n}$, inputted to their respective register file multiplexers 416. Additionally, the A output of the register file 404 goes to the "global response" logic (described below in the detailed description for FIG. 6) as a local response signal $GR_{m,n}$.

The C register 406 is used primarily to hold the intermediate "carry" bit CY of the ALU 402 during multi-bit arithmetic operations. Other input sources to the C register 406 via its multiplexer 418 are the B output of the register file 404 and the internal bus 426, which in turn receives its data from the register file multiplexer 416.

The M register 408 is used to implement the hardware multiplex instruction and to mask the B input to the ALU 402 during such arithmetic operations as multiplication. Input sources to the M register 408 via its multiplexer 420 include the A output of the register file 404, a logical 1 and the internal bus 426.

The input register 410 is a shift register having a 16-bit wide parallel input PI and a serial output SO. The input register 410 accepts data from a 16-bit wide input data bus 428 when the input of that particular processing element 202 has been addressed via its input row IRm and input column ICn enabling signals as decoded by a NAND gate 434. The input register 410 receives the 16-bit data word in pixel format and shifts the data serially out of its output port SO to the register file multiplexer 416. The multiplexer 416 then serially shifts the data word onto the internal bus 426 for receipt by the register file 404 (when the driver 414a is enabled by a memory output enable signal ("MOUT EN*") 440), the M register multiplexer 420, the C register multiplexer 418, external memory via the bi-directional port driver 414a, or the output register 412.

The output register 412 is a shift register having a serial input SI and a 16-bit wide parallel output PO. The output register 412 is serially loaded one bit at a time each time its shift command line C8 is activated. It receives its input data from the register file multiplexor 416 via the internal bus 426. The contents of the output register 412 appear in parallel on the 16-bit wide output register bus 430 and are outputted on the 16-bit wide output data bus 432 when the output of that particular processing element 202 is addressed. When the output of the processing element 202 is addressed, its output row ORm and output column OCn enabling signals, decoded by a NAND gate 438, allow the data to pass from the output register bus 430 to the output data bus 432 via a parallel tri-state buffer 436. Just as with the input data, the output data is also in pixel format.

FIG. 6 illustrates how the matrix 200 of processing elements 202 may be implemented in a custom VLSI circuit 600. The particular implementation shown in FIG. 6 incorporates 64 individual processing elements 202 on a single die 600.

The 64 processing elements 202 on each VLSI circuit 600 are arranged in an 8-by-8 matrix 200 with interconnectivity 206 between adjacent processing elements 202. The 8 processing elements 202 bordering the north, south, east and west edges of the VLSI circuit 600 have bi-directional logic and buffers 601, providing inter-chip communication paths N0-N7, S0-S7, E0-E7, W0-W7, respectively, extended to external pins (not shown) on the VLSI circuit 600. This allows the processing elements 202 on the periphery of a given VLSI circuit 600 to communicate with corresponding peripheral processing elements 202 on other VLSI circuits 600 so that VLSI circuit boundaries 602 remain transparent to the user/programmer.

Separate 16-bit wide input and output data buses 428, 432, respectively, are incorporated into each VLSI circuit 600. The input data bus 428 connects to the input register 410 of each of the 64 processing elements 202 on the VLSI circuit 600. The output data bus 432 connects to the output register tri-state buffer 436 of each of the 64 processing elements 202 on the VLSI circuit 600. Separate input and output addressing and control signals are used on the VLSI circuit 600 to ensure that input data on the input data bus 428 is received by the appropriate processing element 202 and that output data on the output data bus 432 has been extracted from the appropriate processing element 202.

The input register address signals consist of a 6-bit address field, split into a 3-bit input row address ("IR SEL") 608 and a 3-bit input column address ("IC SEL") 610, plus an input row chip select signal ("IR CS*")

740a and an input column chip select signal ("IC CS*") 742a. The 3-bit row and column address lines 608, 610, will select one of the 64 processing elements 202 and cause the input register 410 of that processing element 202 to store the data contained on the input data bus 428 when both the input row and input column chip select signals 740a, 742a, respectively, are active. Input row and column selection are accomplished by the input row select logic 616 and input column select logic 618, respectively. The input row address signals 608 are decoded by the input row select logic 616 into the individual input row enabling signals IRm (IR0-IR7) when the input row chip select signal 740a is active. The input column address signals 610 are decoded by the input column select logic 618 into the individual input column enabling signals ICn (IC0-IC7) when the input column chip select signal 742a is active.

The output register address signals also consist of a 6-bit address field, split into a 3-bit output row address ("OR SEL") 612 and a 3-bit output column address ("OC SEL") 614, plus output row chip select ("OR CS*") 744a and output column chip select ("OC CS*") 746a signals. The 3-bit output row address 612 and the 3-bit output column address 614 select one of the 64 processing elements 202 on the VLSI circuit 600 and cause the output register 412, via its tri-state buffer 436 of that processing element 202, to drive the output data bus 432 when the output row and output column chip select signals 744a, 746a, respectively, are both active. Output row and column selection are accomplished by the output row select logic 620 and output column select logic 622, respectively. The output row address signals 612 are decoded by the output row select logic 620 into the individual output row enabling signals ORm (OR0-OR7) when the output row chip select signal 744a is active. The output column address signals 614 are decoded by the output column select logic 622 into the individual output column enabling signals OCn (OC0-OC7) when the output column chip select signal 746a is active. Thus, access to the input registers 410 and output registers 412 of the individual processing elements 202 on the VLSI circuit 600 is controlled in a manner similar to memory access in a conventional computer.

Also brought onto the VLSI circuit 600 are the 10 bits of command lines C0-C9 and the 18-bit register file address lines 422. The command lines C0-C9 and address lines 422 are realigned with a reframing clock 604 also brought on-board the VLSI circuit 600.

Each of the 64 register file outputs $GR_{m,n}$ on the VLSI circuit 600 contribute to a "global response" output signal 606. The global response output signal 606 is the result of a logical "OR" performed by an OR gate 624 of the "A" outputs of all register files 404 contained in the VLSI circuit 600. The global response signal 606 is outputted in an "open-drain" configuration so that multiple VLSI circuits 600 may be "wire-ORed," thereby allowing the global response signal 606 to be cascaded across chip boundaries 602. The global response signal 606 goes to the intelligent controller 108 for use in conditional jump operations.

Each processing element 202 on the VLSI circuit 600 has a 1-bit, bi-directional off-chip connection $XM_{m,n}$ to external memory 702 (see FIG. 7). These connection $XM_{m,n}$, made through external pins (not shown) on the chip 600, allow each processing element 202, through the use of the external memory 702, to operate on data volumes exceeding the 64-bit limitation imposed by its respective register file 404. The output drivers 414a for the external memory connections comprise part of the bi-directional port 414 located within each processing element 202 (see FIG. 4) and are activated by the memory output enable signal ("MOUT EN*") 440.

To provide fault tolerance, the VLSI circuit 600 provides for the use of an optional input bypass signal ("BYPASS*") 626. When this signal 626 is activated, on-board transceiver circuits (not shown) will connect the eight west peripheral signals W0-W7 directly to the eight east peripheral signals E0-E7 of the same chip 600. Thus, when a fault is detected in a certain processing element 202 or group thereof within the processing array 110, the bypass signal 626 may be activated for the column of chips 600 that contains the defective processing element(s) 202, thereby effectively removing the defective processing element(s) 202 from the active processing array 110. A redundant column of processing elements 202 can then be activated to replace the column containing the defective processing element(s) 202.

FIG. 7 illustrates how a plurality of VLSI circuits 600 of FIG. 6 may be arranged in a matrix-like fashion on a circuit board to comprise an array board 700 of such circuits 600. Such an array board 700, having a 4-by-4 matrix of VLSI circuits 600, which in turn have their own 8-by-8 matrix 200 of processing elements 202, results in a 32-by-32 matrix of processing elements 202 on the array board 700. Such a configuration is not mandated by any inherent limitations of the image processor of the present invention, but rather, is merely one of a virtually unlimited number of configurations whose selection criteria include more practical factors such as convenient board size, conventional packaging techniques, manufacturing costs, etc.

Associated with each of the VLSI circuits 600 on the array board 700 are eight high-speed, byte-wide, static random-access memories ("RAM") 702 to expand the memory capacity of each processing element's register file 404. These RAMs 702 comprise the external memory discussed above in the discussion for FIG. 6.

Each VLSI circuit 600 is connected to its neighboring VLSI circuits 600 via 8-bit wide, bi-directional data buses 704 to provide a fully interconnected network of processing elements 202. These bi-directional data buses 704 comprise the bi-directional, inter-chip communications paths N0-N7, S0-S7, E0-E7, W0-W7, discussed above in the description for FIG. 6. The VLSI circuits 600 on the north, south, east and west peripheries of the array board 700 extend this interconnection of data buses 704 off-board via external connections 705. Thus, since all north, south, east and west connections 705 are brought off-board and onto the system backplane (not shown), processing element arrays 110 may be constructed from any number of processing element array boards 700.

Associated with this array board 700 are several other components needed to interface with the array board 700. These components include the clock receiver 706, the control signal buffer register 708, tri-state input data buffer registers 710, 712, tri-state output data buffer registers 714, 716, input address control logic 718, and output address control logic 720. The clock receiver 706 receives a balanced, differential, emitter-coupled-logic ("ECL") clock signal ("ACLK+", "ACLK−") 707 from the intelligent controller 108 (see above discussion under description for FIG. 1). The clock receiver 706 converts this balanced clock signal 707 into a single-ended clock signal 604 which is used as a reframing clock on-board the VLSI circuits 600 and by the control signal buffer register 708.

The control signal buffer register 708 receives the 10-bit wide command signal ("CMND") 748 and reframes it using the reframing clock 604, thereby creating the ten control signals C0–C9, used by the processing elements 202. The control signal buffer register 708 also receives the register address signals 150 and reframes them using the reframing clock 604, thereby creating the register file address signals 422 used by the register files 404 within the processing elements 202. The control signal buffer register 708 further receives the external memory address signals 152 and reframes them with the reframing clock 604, creating the external memory address lines 722. Lastly, the control signal buffer register 708 receives an external memory output enable strobe ("XM OUT EN*") 750 and reframes it with the reframing clock 604 to create the memory output enable signal 440.

Also brought onto the array board 700, but without reframing, is an external memory write enable strobe ("XM WE*") 752. This signal 752 enables all external memories 702 to perform write operations on data sourced by their respective register file multiplexers 416 (see FIG. 4) via their bi-directional port receivers 414a. Together, the command signal 748, the external memory output enable strobe 750, and the external memory write enable strobe 752 comprise the signals on the command and control bus 148 (see FIG. 1).

The input address control logic 718 receives as inputs a 5-bit input row address signal ("IR ADR") 724, a 5-bit input column address signal ("IC ADR") 726, a 1-bit input row board strobe signal ("IR BRD*") 728a, and a 1-bit input column board strobe signal ("IC BRD*") 730a. The input address control logic 718 decodes these signals 724, 726, 728a, 730a, into the 3-bit input row select signal 608, the 3-bit input column select signal 610, four input row chip select strobe signals 740, and four input column chip strobe signals 742. The input row select signal 608 connects to all the input row select decoders 616 in all the VLSI circuits 600 on the array board 700, and the input column select signal 610 connects to all the input column select decoders 618 in all the VLSI circuits 600 on the array board 700. Of the 4-bit input row chip select strobe signal 740 and 4-bit input column chip select strobe signal 742, one bit from each connects to all input row select decoders 616 in all the VLSI circuits 600 in each row of the array board 700 and all input column select decoders 618 in all the VLSI circuits 600 in each column of the array board 700, respectively.

The output address control logic 720 receives as inputs a 5-bit output row address signal ("OR ADR") 732, a 5-bit output column address signal ("OC ADR") 734, a 1-bit output row board strobe signal ("OR BRD*") 736a, and a 1-bit output column board strobe signal ("OC BRD*") 738a. From these signals 732, 734, 736a, 738a, the output address control logic 720 decodes the 3-bit output row select signal 612, the 3-bit output column select signal 614, a 4-bit output row chip select strobe signal 744, and a 4-bit output column chip select strobe signal 746. The 3-bit output row select signal 612 connects to all output row select decoders 620 in all the VLSI circuits 600 on the array board 700, and the output column select signal 614 connects to all output column select decoders 622 in all the VLSI circuits 600 on the array board 700. Of the 4-bit output row chip select strobe signal 744 and output column chip select strobe signal 746, one bit from each connects to all the output row select decoders 620 in all the VLSI circuits 600 in each row of the array board 700 and all the output column select decoders 622 in all the VLSI circuits 600 in each column of the array board 700, respectively.

The 4 channel input data bus 428 which connects to all the input registers (one channel per array quadrant) 410 within all the processing elements 202 in all the VLSI circuits 600 on the array board 700 receives its data in a time-multiplexed fashion from one of two sources. One source is the DMA input data bus 121 (see FIG. 1), whose data is buffered by a tri-state buffer 710. The second source is the bi-directional host I/O data bus 146, whose data is buffered by a tri-state buffer 712. The bi-directional host I/O data bus 146 is discussed in more detail above within the description for FIG. 1 and below within the description for FIG. 8.

The 4 channel output data bus 432 which connects to all the output register tri-state buffers 436 within all the processing elements (one channel per processing array quadrant) 202 in all the VLSI circuits 600 on the array board 700 is outputted in a time-multiplexed fashion to one of two destinations. One destination is the DMA output data bus 127 (see FIG. 1), following buffering by a tri-state buffer 716. The other destination is the bi-directional host I/O data bus 146, following buffering by a tri-state buffer 714.

FIG. 8 is a functional block diagram for the intelligent controller 108. The intelligent controller 108 is a high-speed, bit-slice computer with built-in command and address generators to control the processing array 110.

Central to the controller 108 is a writable control/store memory 802 implemented with high-speed static RAM. The writable control/store memory 802 contains machine-level program code and coefficient data for the processing array 110, as well as for the embedded computer 806. The contents of the writable control/store memory 802 are downloaded via the local system bus 154 from the system control computer 112 (see FIG. 1).

During program execution, the writable control/store memory 802 is addressed by the program sequencer 804. The program sequencer 804 contains a program counter and incrementer for stepping through the contents of the memory 802. The sequencer 804 also provides the hardware needed to support conditional and unconditional looping, branching, subroutine calling, and interrupt vectoring as directed by the program or hardware. Conditions for looping and branching are provided by the embedded computer 806 or by the global response signal 606 coming from the array 110. One interrupt source is the interrupt signal 144 received by the controller 108 from the input/output interface 106 as discussed above in the description for FIG. 1.

The embedded computer 806 is a 16-bit, externally microcoded, general-purpose microprocessor. The computer 806 operates under the control of the program within the writable control/store memory 802 via the microcode bus 830. The computer 806 may be programmed to provide loop iteration calculations, external memory address computations, global operations upon the contents of the processing elements 202, and special housekeeping chores.

The multiplier 808 provides high-speed multiplication/accumulation of 16-bit input numbers under program control. The multiplier 808 communicates with the computer 806 via the local data bus 832 and is controlled by the microcode bus 830.

The discrete input/output circuit 810 allows external events to initiate, terminate, or modify the execution of the program, as well as to allow the system to control and monitor external devices. The parallel inputs 836 and outputs 838 of the discrete input/output circuit 810 may be individually set, reset, or polled by the computer 806 or by direct program control via the microcode bus 830. The BUSY signal 138 and SYNC signal 142 (see FIG. 1) comprise two of these inputs 836, and the I/O REQ signal 140 comprises one of the outputs 838.

The dual-port RAM 812 provides the embedded computer 806 with data storage space and allows the external system control computer 112 to communicate with the embedded computer 806 via the local system bus 154. One port 840 of the dual-port RAM 812 is controlled by the system control computer 112 via address lines 842 driven by the local system bus 154. The other port 844 is controlled via address lines 846 driven by the memory address register 814 and by the microcode bus 830. The memory address register 814 contains a general purpose counter (not shown) and a stack counter (not shown). Depending upon the addressing mode, either the general purpose counter or the stack counter provides the address information for the second port 844 of the dual-port RAM 812. Both counters in the memory address register 814 may be loaded with data from either the embedded computer 806 via the local data bus 832 or directly from microcode via the microcode bus 830.

The command overlay logic 822 provides the interface between the writable control/store memory 802 and the command and control bus 148. The command overlay logic 822 sends no-operation instructions ("NO OPs") as the command signals 748 when the intelligent controller 108 is idling or is not broadcasting instructions to the processing elements 202. The command overlay logic 822 may also receive data from the embedded computer 806 via the local data bus 832 and then broadcast that data to all processing elements 202 via the command and control bus 148. Additionally, the command overlay logic 822 orders the shifting of data between adjacent processing elements 20 when the external memory address generator 820 determines that data requested by a given processing element 202 resides in the memory of an adjacent processing element 202 (i.e., during relative indexed addressing). The command overlay logic 822 does this by providing the appropriate command signals 748, external memory output enable strobes 750, and external memory write enable strobes 752 to the processing element array boards 700 (see FIG. 7).

The register file address generator 818 generates the three 6-bit register file address signals which constitute the register address lines 150. As discussed earlier, these signals are reframed in a buffer register 708 and become the register file address signals 422 for addressing the three ports of the register files 404 within the processing elements 202. Receiving its instructions and data via the microcode bus 830 and local data bus 832, the register file address generator 818 may generate the addresses directly from microcode, from internal counters (not shown), or automatically increment or decrement its current address counter (not shown) for any or all of the three ports (D, A, B) of the register files 404.

The external memory address generator 820 generates the address signals 152 for the external RAMs 702 associated with the processing element VLSI circuits 600 on the array board(s) 700. The external memory address generator 820 provides the on-demand relative indexed addressing (See description below for FIG. 9.) When an external memory address, referenced as a base pixel row and column offset by row and column indexes, indicates that the data is in the local processing element 202, then the external memory address generator 820 simply computes the physical memory address and sends this address to all RAMs 702 within the processing element VLSI circuits 600 on the array board(s) 700. If the referenced external memory address data is not in the local processing element 202, then with an interrupt signal 848 the external memory address generator 820 will halt the program sequencer 804 and freeze the pipeline register 816. The address generator 820 will then compute the physical memory address, send this address to all the RAMs 702 within the processing element VLSI circuits 600 on the array board(s) 700, and send a 4-bit shift vector 834 to the command overlay logic 822. From the 4-bit shift vector 834, the command overlay logic 822 generates command and control signals 148 which cause the referenced data to be shifted to the local processing element 202.

The host bus transceiver 824 serves as a bi-directional buffer between the local data bus 832 and the host I/O data bus 146, thereby providing the data path between the embedded computer 806 and all the processing elements 202. The host bus transceiver 824 is program controlled via the microcode bus 830.

The input register address generator 828 generates the input row and column address signals 724, 726, respectively, and input row and column board select strobes 728, 730, respectively, for the array boards 700. The output register address generator 826 generates the output row and column address signals 732, 734, respectively, and output row and column board strobe signals 736, 738, respectively, for the array boards 700. The address generators 826, 828 may use address data available from the embedded computer 806 via the local data bus 832, from microcode via the microcode bus 830, or from their internal address counters (not shown).

FIG. 9 is a functional block diagram of the external memory address generator 820 within the intelligent controller 108 of FIG. 8. The external memory address generator 820 is comprised of three main sections, column control 902, row control 904 and image variable control 906. During relative indexed addressing, the column control 902 and row control 904 circuits provide the 4-bit shift vector 834 to the command overlay logic 822 as discussed above. These circuits 902, 904 also provide address data to the image variable control circuit 906 which then provides the external memory address data 152.

The column control circuit 902 and row control circuit 904 are identical and control the horizontal and vertical relative indexed addressing, respectively. Each circuit 902, 904 has a 5-bit base counter 908, 910 which contains the base column and row addresses, respectively, for the current base pixel 302 in each processing element 300 (see description above for FIG. 3). The address data contained in the base counters 908, 910 is initially loaded from the local data bus 832 and may be incremented or decremented during program execution through commands received by way of the microcode bus 830. Using 5 bits of address data in the base counters 908, 910 for both column and row addressing allows each processing element 202 to be assigned up to 1,024 pixels (32-by-32).

Also included in the column and row control circuits 902, 904 are 10-bit index counters 912, 914, 916, 918 to provide the horizontal and vertical indexed addressing data. Two of these counters 912, 914 receive their initial value from the local data bus 832, while the other two counters 916, 918 receive their initial value from the microcode bus 830. This allows the initial address indexing data to be provided by either the embedded computer 806 (see description above for FIG. 8) by way of the local data bus 832 or provided directly from the microcode program stored in the writable control/store memory 802 by way of the microcode bus 830. The counters 912, 914 which receive their address data from the local data bus 832 may have their data incremented or decremented during program execution by way of commands received over the microcode bus 830. The outputs 920, 922 of the column control index counters 912, 916, as well as the outputs 924, 926 of the row control index counters 914, 918, are tri-state multiplexed, thereby creating column and row index data signals 928, 930, respectively, having initial values determined by either the embedded computer 806 or microcode program in memory 802. By using 10 bits of addressing index data, an addressing range of 1,024 pixels may be provided in both the horizontal and vertical axes (−512 to +511).

The outputs 932, 934 of the column and row base counters 908, 910 and the multiplexed outputs 928, 930 of the column and row index counters 912, 914, 916, 918 comprise the address inputs for the column and row programmable read-only memories ("PROM") 936, 938, respectively. For each base value 932, 934 and each index value 928, 930, each PROM 936, 938 provides 15 bits of information. Two of the 15 bits represent shift direction information. The column control PROM 936 produces two 1-bit signals 940, 942 indicating shift directions of east and west. These signals 940, 942 are buffered by a register 948. These buffered outputs 941, 943 comprise half of the 4-bit shift vector 834 going to the command overlay logic 822. Similarly, the row control PROM 938 produces two 1-bit signals 944, 946 which indicate shift directions of north and south. These signals are buffered by a register 950. These buffered output signals 945, 947 comprise the remaining half of the 4-bit shift vector 834 going to the command overlay logic 822.

Eight of the 15 bits of information provided by each of the PROMs 936, 938 comprise 8-bit shift counter signals 952, 954. These shift count signals 952, 954 represent the number of shift cycles needed to complete the shifting of pixel data along the east-west and north-south axes during a relative indexed addressing operation. These shift count signals 952, 954 are used to pre-load counters 956, 958. Once the requisite shift cycles have been completed, the terminal count outputs 953, 955 of the counters 956, 958 indicate completion of the relative indexed addressing operation. These terminal count output signals 953, 955 comprise the interrupt signal 848 monitored by the program sequencer 804 as discussed above.

The remaining five bits of the 15 bits of information provided by each of the PROMs 936, 938 comprise the upper address bit signals 960, 962 which provide the most significant bits of the external memory address signal 152 ultimately produced by the external memory address generator 820. These signals 960, 962 are inputted into a selection jumper matrix 964, described in detail below, within the image variable control circuit 906.

The image variable control circuit 906 provides the least significant bits of the external memory address signal 152 ultimately produced by the external memory address generator 820. These least significant bits comprise the image variable address which is formed by the addition of a 10-bit image base and an 8-bit image index. The image base is the address of the least significant bit of a data item in the external memory. The image index, added onto the image base, allows all successively significant bits in the data item to be accessed. The image base value is loaded into a register 966 by way of the local data bus 832 or into another register 968 by way of the microcode bus 830. Similarly, the image index value is loaded into a register 970 by way of the local data bus 832 or into another register 972 by way of the microcode bus 830. Thus, the image base and index values may come from the embedded computer 806 or directly from microcode via program memory 802. The outputs 967, 969 of the image base value registers 966, 968 are tri-state multiplexed to create a 10-bit image base value signal 974. Similarly, the outputs 971, 973 of the image index value registers 970, 972 are tri-state multiplexed to create a single 8-bit image index value signal 975. The multiplexed 10-bit image base value signal 974 and the multiplexed 8-bit image index value signal 975 are summed together in an adder 976, creating a 10-bit image variable address signal 977. This image variable address signal 977 is inputted into the selection jumper matrix 964.

The selection jumper matrix 964 selects the 16 bits that are to be used to form the final relative indexed address from its 20 input bits, i.e., the two 5-bit upper address signals 960, 962 and the 10-bit image variable address signal 977. The 16-bit output signal 978 of the selection jumper matrix 964 is buffered by a register 979 before becoming the relative indexed address signal 980.

The selection jumper matrix 964 basically consists of a matrix of hard-wire connections (not shown) which will predetermine how many bits of the 5-bit upper address signals 960, 962 will be used, as well as how many bits of the 10-bit image variable address signal 977. Thus, these hard-wire connections are selectably made based on the desired size of the domain of each processing element 202 (see discussion above for FIG. 3) and the desired depth of each pixel within each processing element 202. Furthermore, these hard-wire connections within the selection jumper matrix 964 are selected in conjunction with the programming of the internal memory elements of the programmable read-only memories 936, 938 (discussed above).

Having a 16-bit relative indexed address signal 980 allows up to 65,536 bits of external RAM to be accessed by each processing element 202. Using the selection jumper matrix 964 allows the user to trade between virtual processing element size (see description above for FIG. 2) in the horizontal and vertical dimensions against virtual processing element memory depth, while remaining within the processing element physical memory limit of 64 kilobits. For example, if a virtual processing element size of 32-by-32 pixels is mapped into a single physical processing element 202, thereby requiring all five bits of each of the column control upper address signal 960 and row control upper address signal 962, then only six address bits will remain for virtual processing element memory depth, allowing 64 bits of RAM to be accommodated per virtual pixel. If, however, a virtual processing element size of 4-by-4 pixels is mapped into a single physical processing element 202, thereby requiring only two bits from each of the column control upper address signal 960 and row control upper address signal 962, and row control upper address signal 962, then twelve address bits will remain for virtual processing element memory depth, allowing 4,096 bits of RAM to be accommodated per virtual pixel.

Also contained within the image variable control circuit 906 is the capability of providing a direct address signal when no relative indexed address is needed. The direct address generator is comprised of two 16-bit counters 982, 984 and a 16-bit buffer register 987. One counter 982 is initialized by the embedded computer 806 via the local data bus 832. The other counter 984 is initialized directly from microcode via the microcode bus 830. Both counters 982, 984 may be incremented or decremented during program execution by way of commands received over the microcode bus 830. The outputs 983, 985 of the counters 982, 984 are tri-state multiplexed so as to allow program selection via microcode of one to become the multiplexed direct address signal 986 which is buffered by a register 987 before becoming the final direct address signal 988.

The final output signal 152 of the external memory address generator 820 consists of either the relative indexed address signal 980 or the direct address signal 988. Selection of the appropriate address signal is accomplished by tri-state multiplexing the outputs of the address signal buffer registers 979, 987. This multiplexing is accomplished by providing the appropriate command signals via the microcode bus 830 to the registers 979, 987.

FIG. 10 is a functional block diagram of a retargetable cross-compiler 1000 used in a preferred embodiment of the present invention. The basic functional elements of the cross-compiler 1000 comprise a compiler input translator 1002, compiler language optimizer 1004, microcode generator 1006, microcode optimizer 1008, and an assembler/linker 1010. A cross-compiler of this type is commercially available under the product name "Software Foundry" from Quantitative Technology Corporation of Beaverton, Oregon.

Target data 1012 representing the hardware model for the image processor of the present invention is provided to each of the elements 1002, 1004, 1006, 1008, 1010 of the cross-compiler 1000. By doing so, the inputted source code 1014 will be compiled into the proper microcode 1016 for the modelled hardware configuration (e.g., selected dimensions for matrix 200 of processing elements 202, as described above for FIG. 2).

The source code program 1014 (e.g., "C," ADA, FORTRAN, etc.) is inputted into the compiler input translator 1002 wherein the source code 1014 is parsed and checked for proper syntax, and then translated into a compiler-specific language 1018 which is independent from the inputted source code 1014. By using this compiler-specific language 1018, only the compiler input translator 1002 need be capable of distinguishing which source code 1014 language is being inputted, while the remaining cross-compiler elements 1004, 1006, 1008, 1010 may be of fixed configurations.

The compiler-specific language 1018 is optimized by the compiler language optimizer 1004 for efficiency of execution (by the image processor of the present invention). The optimized compiler-specific language 1020 is translated into microcode 1022 by the microcode generator 1006. The freshly generated microcode 1022 is optimized by the microcode optimizer 1008 for efficiency of execution (by the intelligent controller 108 of the image processor of the present invention). Finally, the optimized microcode 1024 is assembled and linked by the assembler/linker 1010, whereupon the assembled/linked microcode output 1016 is sent via the local system bus 154 to the writable control/store memory 802 within the intelligent controller 108 (see description above for FIG. 8).

The foregoing description is to be considered as merely exemplary and not limiting in any way with respect to the present invention and any embodiment thereof. The specific scope and subject matter of the present invention is to be determined according to the claims.

What is claimed is:

1. An image processing system for processing image data provided by an external image sensor which provides digital image data having a predetermined number of bits of data corresponding to a predetermined number of pixels, said processing system comprising:

a plurality of interconnected processing elements for receiving and processing said digital image data, each of said processing elements comprising:

storage means for storing received and processed digital image data;

arithmetic-logic means, coupled to said storage means and receiving data therefrom, for performing arithmetic and logical binary operations upon said data received from said storage means and for outputting results of said arithmetic and logical binary operations to said storage means as processed digital image data;

first bussing means, coupled to said processing elements for receiving said digital image data from said sensor and routing said digital image data to said processing elements;

second bussing means, coupled to aid processing elements for routing said processed digital image data from said processing elements;

controller means for controlling said routing of said digital image data to and from said processing elements along said first and second bussing means and for controlling said processing elements; and image to processing element correspondence means for coordinating the routing of said image data between said controller means and said plurality of processing elements and for coordination of the processing of said image data so as to provide a virtual correspondence between said pixels and said processing elements independently of the relative number of said pixels and said processing elements.

2. A processing system as set out in claim 1, wherein said storage means comprises a multi-ported register file memory comprising an input data port, a first output data port, a second output data port, an input data port address input, a first output data port address input and a second output data port address input.

3. A processing system as set out in claim 2, wherein said input data port address input and said first and second output data port address inputs of said multi-ported register file memory may be individually and independently addressed and enabled.

4. A processing system as set out in claim 2, wherein said input data port of said multi-ported register file memory may input data independently and simultaneously as data is outputted from said first output data port and said second output data port of said multiported register file memory.

5. A processing system as set out in claim 1, wherein each of said processing elements further comprises an input data multiplexer having a plurality of selectable input data ports and an output data port, wherein said output data port is coupled to said storage means.

6. A processing system as set out in claim 5, wherein said digital image data received by said processing elements is provided in pixel parallel form.

7. A processing system as set out in claim 6, wherein each of said processing elements further comprises a parallel-to-serial digital data converter having a parallel input data port and a serial output data port, wherein said serial output data port is coupled to one of said selectable input data ports of said input data multiplexer.

8. A processing system as set out in claim 6, wherein each of said processing elements further comprises a serial-to-parallel digital data converter having a serial input data port and a parallel output data port, wherein said serial input data port is coupled to said output data port of said input data multiplexer.

9. A processing system as set out in claim 1, wherein each of said processing elements further comprises a data storage transceiver means for transmitting data to and receiving data from data memory devices external to and associated with said processing element.

10. A processing system as set out in claim 1, wherein each of said processing elements further comprises a data transfer transceiver means for transmitting data to and receiving data from other processing elements within said plurality of processing elements.

11. A processing system as set out in claim 9, wherein said data storage transceiver means comprises a single bi-directional signal path having a signal transceiver at each end.

12. A processing system as set out in claim 11, wherein said signal path and transceivers convey said data in serial form.

13. A processing system as set out in claim 11, wherein said signal path and transceivers convey said data in parallel form.

14. A processing system as set out in claim 9, wherein said data storage transceiver means comprises a transmitting signal path and a separate receiving signal path, said transmitting signal path originating with a signal driver and said receiving signal path terminating with a signal receiver.

15. A processing system as set out in claim 14, wherein said signal paths, signal driver and signal receiver convey said data in serial form.

16. A processing system as set out in claim 14, wherein said signal paths, signal driver and signal receiver convey said data in parallel form.

17. A processing system as set out in claim 10, wherein said data transfer transceiver means comprises a single bi-directional signal path having a signal transceiver at each end.

18. A processing system as set out in claim 17, wherein said signal path and transceiver convey said data in serial form.

19. A processing system as set out in claim 17, wherein said signal path and transceiver convey said data in parallel form.

20. A processing system as set out in claim 10, wherein said data transfer transceiver means comprises separate transmitting and receiving signal paths, said transmitting signal path originating with a signal driver and said receiving signal path terminating with a signal receiver.

21. A processing system as set out in claim 20, wherein said signal paths, signal driver and signal receiver convey said data in serial form.

22. A processing system as set out in claim 20, wherein said signal paths, signal driver and signal receiver convey said data in parallel form.

23. An image processing system for processing image data provided by an external image sensor which provides digital image data having a predetermined number of bits of data, said processing system comprising:
a plurality of interconnected processing elements for receiving and processing said digital image data to provide processed digital image data, said plurality of processing elements being electrically configured in a two-dimensional matrix, said matrix comprising a plurality of rows and a plurality of columns in which a processing element is electrically located at the intersection of each row and each column, each of said processing elements having an address corresponding to the respective row and column in which each processing element lies;
first bussing means, coupled to said processing elements for receiving said digital image data from said sensor and routing said digital image data to said processing elements;
second bussing means, coupled to said processing elements for routing said processed digital image data from said processing elements; and
controller means for controlling said routing of said digital image data to and from said processing elements along said first and second bussing means and for controlling said processing elements and for directly and randomly accessing image data in said processing elements, said controller means including a memory having a plurality of address locations, wherein said address locations correspond to said addresses of said processing elements, such that said addresses of said processing elements are memory-mapped into said controller means.

24. An image processing system for processing digital image data having a predetermined number of bits of data corresponding to an image having a plurality of pixels arranged in a matrix, said processing system comprising:
a plurality of interconnected processing elements for receiving and processing said digital image data, said plurality of processing elements being electrically configured in an array;
data transfer means for transmitting data to and receiving data from other processing elements within said plurality of processing elements;
first bussing means, coupled to said processing elements for receiving said digital image data and routing said digital image data to said processing elements;
second bussing means, coupled to said processing elements for routing said processed digital image data from said processing elements; and
controller means for controlling said routing of said digital image data to and from said processing elements along said first and second bussing means and for controlling said processing elements, said control of said processing elements comprising controlling accessing of image data corresponding to a target pixel stored in a first one of said processing elements and instructing a second of said processing elements to receive and process the target pixel image data from said first one of said processing elements, based upon a relative indexed address, wherein said relative indexed address corresponds to the number of rows and number of columns of said matrix separating said base pixel in said second processing element receiving said image data from said target pixel in said first processing element from which said image data is to be received.

25. A processing system as set out in claim 23, wherein said first bussing means comprises a plurality of parallel signal paths.

26. A processing system as set out in claim 24, wherein said first bussing means comprises a plurality of parallel signal paths.

27. A processing system as set out in claim 25, wherein said plurality of parallel signal paths equals said predetermined number of bits of data.

28. A processing system as set out in claim 23, wherein said second bussing means comprises a plurality of parallel signal paths.

29. A processing system as set out in claim 24, wherein said second bussing means comprises a plurality of parallel signal paths.

30. A processing system as set out in claim 26, wherein said plurality of parallel signal paths equals said predetermined number of bits of data.

31. A processing system as set out in claim 23, wherein said controller means comprises a plurality of control signal paths for conveying control signals from a computer.

32. A processing system as set out in claim 24, wherein said controller means comprises a plurality of control signal paths for conveying control signals from a computer.

33. A processing system as set out in claim 23, wherein said controller means comprises a microprocessor and associated memory elements containing microcoded commands.

34. A processing system as set out in claim 24, wherein said controller means comprises a microprocessor and associated memory elements containing microcoded commands.

35. An image processing system for processing image data provided by an external image sensor which provides digital image data having a predetermined number of bits of data, said processing system comprising:

a plurality of interconnected processing elements for receiving and processing said digital image data, said plurality of processing elements being electrically configured in a two-dimensional matrix comprising a plurality of rows and a plurality of columns in which a processing element is electrically located at the intersection of each row and each column and the respective address for each of said processing elements corresponds to the respective row and column in which each processing element lies, each processing element including a relative address generator circuit comprising:

first instruction reception means for receiving first microcode instructions indicative of, a relative digital memory location being relative to a reference digital memory location, said digital memory locations each containing a plurality of digital bits therein;

first decoding means for decoding said first microcode instructions into said relative address data, said relative address data being representative of a relative digital memory location;

second instruction reception means for receiving second microcode instructions indicative of bit data, said bit data being representative of a digital bit located within said relative digital memory location;

first address data reception means for receiving direct address data, said direct address data being representative of said digital bit;

first selection means for selecting a range of possible values for said relative address data;

second selection means for selecting a number of said digital bits to be represented by said bit data;

combination means for combining said relative address data with said bit data to create relative indexed address data; and third selection means for selecting between said relative indexed address data and said direct address data; and controller means for controlling routing of said digital image data to and from said processing elements and for controlling said processing elements, said control of said processing elements comprising provision of first and second microcode instructions and first address data to said processing elements when instructing said processing elements to receive and process image data from other processing elements.

36. A relative address generator circuit as set out in claim 35, wherein said first instruction reception means comprises a row address instruction reception means and a column address instruction reception means.

37. A relative address generator circuit as set out in claim 36, wherein said row and column address instruction means each comprise a digital counter, each of said digital counters being capable of being preset to a selectable value and incremented and decremented therefrom.

38. A relative address generator circuit as set out in claim 35, wherein said first decoding means comprises first and second programmable memory devices having address inputs and data outputs, said address inputs of said first programmable memory devices being coupled to said digital row counter, said address inputs of said second programmable memory devices being coupled to said digital column counter, said data outputs of said programmable memory devices comprising said relative address data.

39. A relative address generator circuit as set out in claim 35, wherein said second instruction reception means comprises a digital register.

40. A relative address generator circuit as set out in claim 35, wherein said first address data reception means comprises a digital counter capable of being preset to a selectable value and incremented and decremented therefrom under program direction.

41. A relative address generator circuit as set out in claim 35, wherein said first and second selection means and said combination means together comprise a matrix of electrical jumper connections.

42. A relative address generator circuit as set out in claim 35, wherein said third selection means comprises digital registers having tri-state output data ports.

43. A relative address generator circuit as set out in claim 35, wherein said third selection means comprises digital registers having tri state output data ports.

44. An image processing method for processing digital image data having a predetermined number of bits of data corresponding to the pixels of an image having a matrix of pixels by a plurality of processing elements electrically configured and interconnected in a two-dimensional array, said pixel matrix having a plurality of rows and a plurality of columns, said processing method comprising the steps of:

routing said digital image data to said plurality of processing elements;

selectively storing said digital image data associatively with respect to said processing elements;

accessing and acquiring, by a first processing element, digital image data corresponding to a target pixel initially stored associatively with respect to a second processing element, said first processing element accessing said digital image data by specifying the relative location of said target pixel relative to the location of base pixel in said first processing element within said matrix of pixels, said relative location corresponding to the number of said rows and number of said columns separating said target pixel and base pixel;

processing said accessed and acquired digital image data arithmetically and logically, selectably, within said processing elements; and routing said processed digital image data out from said plurality of processing elements.

45. An image processing system as set out in claim 1 wherein said plurality of processing elements are electrically configured in an array and wherein said correspondence means comprises:

means for mapping said predetermined number of pixels to sad plurality of processing elements, wherein said predetermined number of pixels may vary and may be greater than the number of said processing elements; and means for controlling the accessing of image data of a pixel for processing by a first one of said processing elements, from the storage means of a second one of said pixel processing elements, base upon the relative position of said pixel to a base pixel stored in a first processing element within said array.

* * * * *